United States Patent [19]

Boykin

[11] 4,379,284
[45] Apr. 5, 1983

[54] COHERENT PHASE SHIFT KEYED DEMODULATOR FOR POWER LINE COMMUNICATION SYSTEMS

[75] Inventor: John R. Boykin, Arnold, Md.

[73] Assignee: Westinghouse Electric Corp., Pittsburgh, Pa.

[21] Appl. No.: 284,261

[22] Filed: Jul. 17, 1981

Related U.S. Application Data

[62] Division of Ser. No. 77,824, Sep. 21, 1979, Pat. No. 4,311,964.

[51] Int. Cl.³ .................. H03D 3/00; H04L 27/22; H04M 11/04
[52] U.S. Cl. .................. 340/310 R; 375/83; 340/825.7
[58] Field of Search ............ 340/310 R, 825.7; 375/82, 83, 52, 39

[56] References Cited

U.S. PATENT DOCUMENTS 4,027,266 5/1977 Clark .................. 375/82
4,246,654 1/1981 Malm .................. 375/83
4,311,964 1/1982 Boykin .................. 375/83

Primary Examiner—Donald J. Yusko
Attorney, Agent, or Firm—Robert E. Converse, Jr.

[57] ABSTRACT

An apparatus and method for coherent phase demodulation of a binary phase shift keyed carrier includes sequentially processing plus and minus polarity samples of plural carrier segments occurring within each carrier data symbol. The samples for each segment provide a binary coded signal for producing corresponding first and second relative phase angle vector signals. The second vector signals are summed over several data symbols to generate reference phase angle signal vector signals. Correlation signals are produced from phase comparison of each of the first vectors with the reference vector signals. The correlation signals are summed in a synchronized relationship for the carrier segments included in each data symbol. The sums of the correlation signals represent either positive or negative correlations with the one and zero data bits of the carrier data symbols.

7 Claims, 17 Drawing Figures

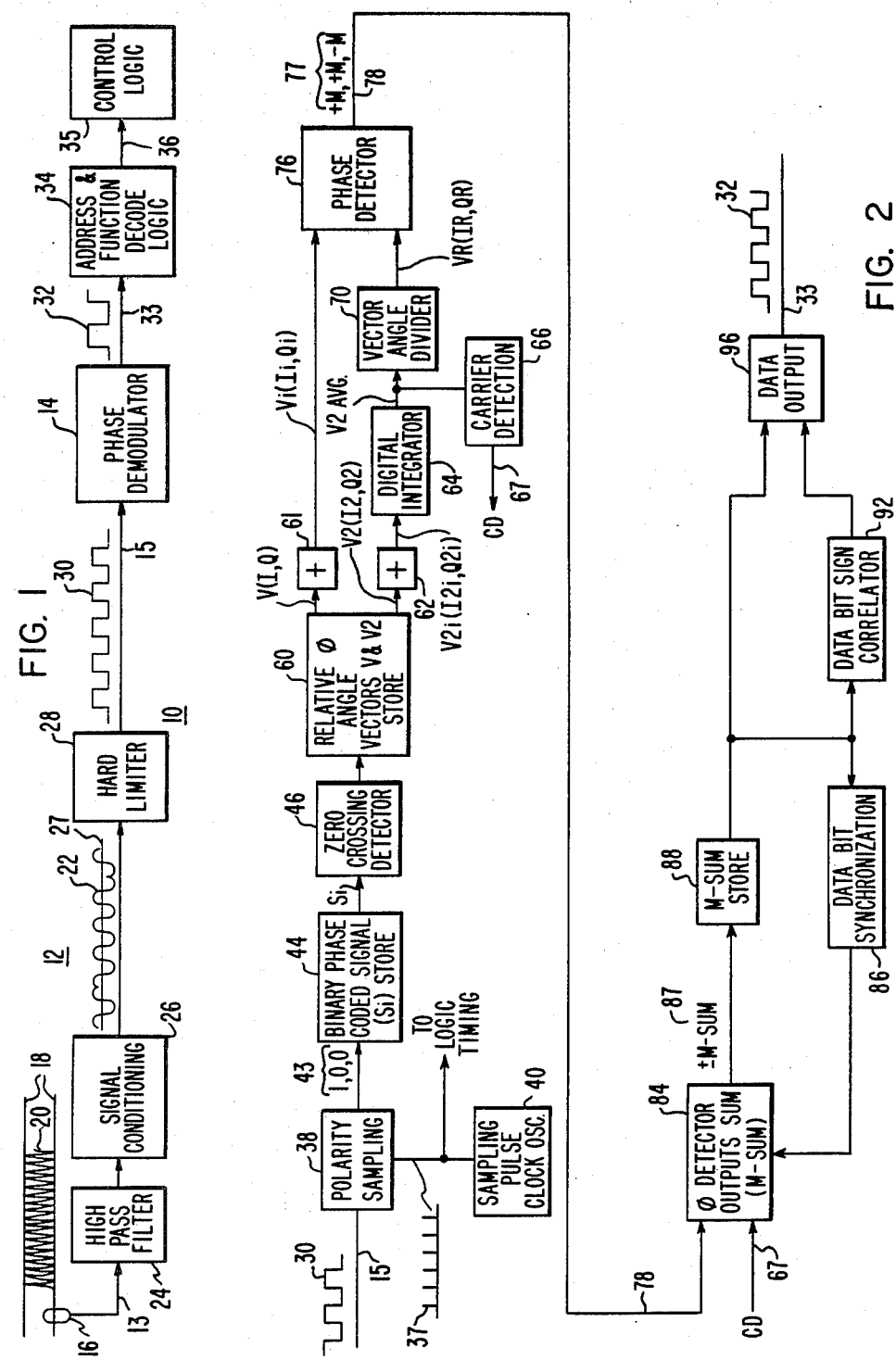

V VECTORS (I,Q)

V2 VECTORS (I2, Q2)

REFERENCE VECTOR
VR (IR, QR) PLANE

| TIME → | T1 | T2 | T3 | T4 | T5 | T6 | T7 | T8 | T9 | T10 |
|---|---|---|---|---|---|---|---|---|---|---|
| DATA BITS → | ONE | | | ZERO | | | ONE | | | |
| ∅ DETECTOR OUTPUTS | +M | +M | −M | −M | −M | −M | +M | +M | +M | +M |
| COUNTER 128 (Cis) | 3 | 2 | 1 | 0 | 3 | 2 | 1 | 0 | 3 | 2 |
| COUNTER 132 (Css) | 0 | 0 | 1 | 2 | 3 | 0 | 1 | 2 | 3 | 0 |
| M STORE REGS. | | | | | | | | | | |
| 181 | +M | +M | +M | +M | −M | −M | −M | −M | +M | +M |
| 182 | 0 | +M | +M | +M | +M | −M | −M | −M | −M | +M |
| 183 | 0 | 0 | −M | −M | −M | −M | +M | +M | +M | +M |
| 184 | 0 | 0 | 0 | −M | −M | −M | −M | +M | +M | +M |
| M-SUM STORE REGS. | | | | | | | | | | |
| 185 | M | M | M | M | 3M | 3M | 3M | 3M | 5M | 5M |
| 186 | 0 | 2M | 2M | 2M | 2M | 6M | 6M | 6M | 6M | 10M |
| 187 | 0 | 0 | M | M | M | M | 3M | 3M | 3M | 3M |
| 188 | 0 | 0 | 0 | 0 | 0 | 0 | 0 | 0 | 0 | 0 |

DATA BIT SYNCHRONIZATION

FIG. 10

COHERENT PHASE SHIFT KEYED DEMODULATOR FOR POWER LINE COMMUNICATION SYSTEMS

This is a division of application Ser. No. 077,824, filed Sept. 21, 1979, now U.S. Pat. No. 4,311,964.

BACKGROUND OF THE INVENTION

1. Field of the Invention

This invention relates to an improved method and apparatus for coherent phase demodulation for use at communication terminals receiving a binary phase modulated carrier. More particularly, an improved coherent phase demodulator generates stored fundamental and double frequency phase angle vector signals in response to phase coded signals derived from sampling subdata symbol segments of the carrier. The fundamental vector signals representing each carrier segment are compared with reference fundamental phase angle vector signals derived from the double frequency vector signals representing many segments to produce correlation signals which are summed for each data symbol.

2. State of the Prior Art

In carrier communication systems generally, binary coded data signals modulate a carrier when it is transmitted and then upon the signal being received, it must be detected so that the data bit information is quickly, reliably and accurately recovered after the carrier signal has been subjected to and combined with attenuation, signal noise and other interference and distortion effects causing serious degradation of the signal. In power line communication systems of the automated distribution type, the transmitted carrier signal is particularly subjected to severely interfering impulse and broad-band noise conditions due to being transmitted with electric power conducted along power line distribution conductors. Another consideration in power line communication systems is that the system often includes one or more transmitting stations, optional signal repeaters and large numbers of remote terminals each being located at a power customer location. Message encoded carrier signals are often sent in alternative addressing modes to be received concurrently at large groups of remote terminals or to be received at individual repeaters or terminals. When multiple frequency carrier signals are utilized, substantial complexity can be involved in frequency isolation and discrimination and in avoidance of mutual signal interference. In using single frequency tones or carrier signals, it is important that a receiving terminal or repeater quickly detect the carrier signal since many messages may be time multiplexed for selectively addressing different ones of the terminals or repeaters. It has been found that coherent detection and demodulation systems utilizing a pilot or unmodulated synchronizing signal or combined encoded data and synchronization pulses further adds to the complexity of power line communications equipment. While it is known to use the power signals, typically occurring at fifty or sixty Hz, for carrier synchronization, observed discontinuities in the electric power line paths, such as due to phase transitions between polyphase lines and the like, do not always allow the power signals to be a reliable external synchronization means although an available one.

In non-coherent detection systems, such as those often used for frequency shift keyed carrier signals, the amplitude envelope of the carrier signal is frequently used to establish an indication of a start of message. Noise impulses and spikes can often be the source of erroneous start of message indications and cause the affected receivers to attempt address decode operations and other ambiguous operations causing unsatisfactory performance. Accordingly, the general demodulator requirements for receiving terminals of power line carrier communication systems include optimum detection of the carrier signals in the presence of noise and other interfering signals, selection of the basis for detecting the presence or absence of the carrier signal, little or slight deviation of the receiver and detector operation from an ideal performance, synchronization of the receiver and detector with the carrier signal, synchronization with each data bit of the encoded message information, on a polarity synchronization with the binary states of the data bits so as to provide a final error free recognition and reconstitution of the message information data bits as originally transmitted. To optionally satisfy the foregoing requirements, phase modulated carrier signals, being of the phase shift keyed (PSK) or coherent phase shift keyed (CPSK) type, are utilized to recover the encoded carrier data contained in the carrier phase relationships so that no carrier envelope amplitudes have to be observed. Signal conditioning of received phase modulated carrier signals includes limiting and clipping of noise spikes in a wide bandwidth followed by amplification and signal limiting in a narrow bandwidth so that the reconstituted carrier at a phase demodulator input is less susceptible to broadband and impulse noise in many applications. Often, in the detection of coherent phase modulation signals, a locally generated signal or local oscillator is required to be synchronized with the incoming signal before correlation can be started. Substantial time can be required prior to signal processing for detection and demodulation of the received data.

Another general technique of phase detection is a so-called differential phase shift keyed type in which the incoming signal is applied to a delay line and then input to a phase detector along with the original signal for comparison with the immediately preceding data bit. Each data bit is processed to compare with the preceding data bit so that it will output a polarity which is the same or which is opposite of the preceding data bit. One disadvantage of this type of phase detection is that the reference uses information included in only a single bit and includes as much noise as is included in the data bit being processed, resulting in a degradation in performance. The differential phase shift keyed systems are sometimes operated at low data rates to assure more accurate and error free operation which in turn causes a limitation in the quantity of data than can be transmitted during a predetermined time interval.

With aforementioned considerations and requirements of phase demodulators in mind, the present invention is directed to a coherent phase demodulator having increased simple and reliable operation with optimum performance utilizing a minimum of operations which are uniquely combined and controlled to produce a system particularly advantageous for use at receiving communication terminals of a power line communication system as summarized hereinafter.

SUMMARY OF THE INVENTION

In accordance with the present invention, a coherent phase demodulator and method for coherent phase demodulation are provided for detecting binary data symbols which are represented in a sinusoidal carrier with binary one data bits represented by the nominal carrier phase and binary zero data bits represented by 180° phase shift in the carrier. The phase modulated carrier is characterized as being of the phase reversal keyed type or coherent phase shift keyed (CPSK) type. The carrier is hard limited at the receiver to produce hard limited square wave carrier signals having bipolar phase encoded data bits having identical data bit intervals or data symbol times defining a predetermined data rate. The data bits are synchronized with the carrier signal so as to be integrally related to the carrier signal frequency. The opposite states or levels of the hard limited carrier signals are sampled at a sampling pulse rate wherein the ratio of the sampling rate and carrier frequency is not an integer. A predetermined group of equally spaced polarity sample signals are produced representing the phase of a cycle of the carrier during equal fractional segments of a carrier data bit interval. Each group of sample signals is sequentially stored to form a binary phase coded signal which represents a phase image of the carrier in each data bit segment. For example but not limitation, four such eight-bit phase coded image signals can be provided during each data bit interval. Since the binary state of adjacent bits in the phase coded image signal are reversed when they represent a polarity crossing of the carrier signal, the bit transitions represent zero crossings or polarity transitions and, therefore, the phase reversals in one complete cycle of the carrier signal during the sampling of a carrier data bit segment.

A zero crossing detector determines the relative positions of bit transitions and directions of the bit transitions within the phase coded image signals by relating them to corresponding sample counts. First stored vector signals represent different relative phase angles of one cycle at a fundamental frequency the same as the carrier frequency. Second stored vector signals represent relative phase angles of two cycles at a double frequency or second harmonic frequency being twice the carrier frequency. The sample counts of detected zero crossings establish the corresponding relative phase angles represented by correspondingly selected ones of the stored fundamental and second harmonic vector signals. One of eight different relative phase representations of each of the first and second vector signals correspond to each of eight bit cells in a binary image signal where the zero crossings can be detected. The two groups of stored vector signals include digital values of an in-phase I component and a quadrature phase Q component defining each of octangular fundamental frequency vectors V and of an in-phase I2 component and quadrature phase Q2 component defining each of eight, second harmonic frequency vectors V2. Thus, I, Q, I2, and Q2 component signals are selectable from two vector lookup tables as binary representations of the quadrature components. The component signals are summed separately for deriving a resultant fundamental frequency relative phase angle representation Vi and a resultant second harmonic relative phase angle representation V2i for each phase coded image signal derived from sampling each separate carrier segment.

The resultant second harmonic vector components are digitally integrated over a predetermined number of carrier segments or corresponding phase image signals to produce second harmonic vector average signals V2avg. which are used both to detect a strong second harmonic energy component in the received carrier as a measure of carrier detection and to further provide reference phase angle vector signals VR. The reference vector signals VR are represented by in-phase and quadrature phase components IR and QR obtained from vectorially dividing I2avg. and Q2avg. components representing the second harmonic vector average signals by two. The resultant fundamental vector Vi is represented by Ii and Qi components for each phase coded image signal of a carrier segment. Ii and Qi and the IR and QR component signals are applied to a phase detector where the detector output is a correlation signal ±M having a large relative value or magnitude and a plus or minus polarity when there is high positive or negative correlation of the detector inputs in response to either of the opposite data bit phase conditions in the carrier segments.

Since there are four phase detector output correlation signals corresponding to the four carrier segments for each data bit interval, the sums of groups of four detector output ±M correlation signals are synchronized as they are derived from an associated data bit interval. Also, the polarity of the sign of the sum of four correlation signals M-sum is correlated with the binary logic state or polarity of the received carrier data bit represented by the sum of each four correlation signals. Synchronization of the demodulator with each carrier data bit is provided by the demodulator processing preamble data bits in each data transmission carried by the carrier. The preamble includes a predetermined number of alternate data bit ones and zeros, used for synchronization, followed by two consecutive data bit ones used to resolve the data bit polarity ambiguity. The ±M correlation signals are sequentially stored and then different groups of four correlation signals are summed and the M-sum summed values are compared to determine bit synchronization. A further operation is required following the bit synchronization so as to correlate the sign of the sums of the correlation signals with the binary logic state, one or zero, of each carrier data bit. At the times of receiving the two consecutive polarity indicator bits in the preamble, their known binary state is compared with the signs of two consecutive sums (M-sum) of four ±M correlation signals. A data bit sign correlator relates the sign of a correlation sum value to the binary logic of the received data bits to produce data bit logical states at the demodulator output which match the received carrier data bit logic. Thus, the demodulator output produces a reconstituted data bit for each data bit phase modulating the received carrier.

Accordingly, a general feature of the present invention is to provide a method and apparatus for coherent phase demodulation in a communications system transmitting a CPSK carrier through the power line conductors of a electric power distribution system wherein demodulation is produced by relative phase angle vector signals derived from single ones of plural segments of the carrier data bit intervals and correlating the single segment vector signals with a reference provided by averaged relative phase angle vector signals representing summed vector values of a predetermined prior number of the carrier segments and thereafter summing the resultant correlation signals in a predetermined synchronized relationship with each received carrier data bit interval. A still further feature of the present invention is providing stationary or fixed phase angle representations of the carrier being received by generating corresponding vector signals derived from sampling time periods or windows each corresponding to segments of the received carrier that are sampled by equal numbers of polarity sampling pulses which have a rate not harmonically related to the carrier frequency and still further providing reference phase angle vector signals which are derived from dividing average representations of the sums of the second harmonic vector signals of a predetermined number of the carrier segments without altering the sampling pulse frequency to effect coherent demodulation and without generating any reference phase angle signals which are produced by time consuming control of the frequency of a local oscillator.

It is a still further feature of the present invention to provide a coherent phase demodulator including stored component signal values representing relative phase angles at fundamental and double frequencies each defining one of eight relative phase angle representations corresponding to the zero crossings detected in a binary phase coded image signal of a carrier segment within each data bit interval. Signal values of the double frequency vector components are applied to a digital integrator to sum their values over several data bit intervals and derive average representations of second harmonic vector signals to both detect the presence of the carrier and produce averaged reference vector signals being developed from past occurrences of several data bits for correlation with the vector signals representing each binary phase coded image signal. A still further feature of the present invention is to provide bit synchronization of phase modulated carrier data bit intervals without changing a sampling pulse rate or frequency by sequentially storing groups of polarity sample bit signals occurring at fortyfive degree displaced phase angles of spaced cycles of carrier segments and phase detecting a relative phase angle vector representation of each group of sample signals with respect to a reference relative phase angle vector and then storing the sums of absolute values of plural correlation signals and sequentially detecting the maximum absolute sums of correlation signals to indicate a grouped sequence of the correlation signals to be synchronized with a received carrier data bit interval. The data bit synchronization is established initially so that data bit polarity ambiguity can be resolved by detecting the identical signs of two consecutively occurring correlation signal sums produced by two consecutive polarity indicator data bits received in a preamble portion of the carrier data transmission.

These and other aspects and advantages of the present invention will be apparent from the description of the preferred embodiment as shown in the drawings briefly described hereinafter.

BRIEF DESCRIPTION OF THE DRAWINGS

FIG. 1 is a block diagram of a communications terminal including a coherent phase demodulator made in accordance with the present invention;

FIG. 2 is a block diagram of the demodulator shown in FIG. 1;

FIG. 10 is a diagram for illustrating the operation of the M-store registers and M-sum store registers in FIG. 9C during the data bit synchronization mode of operation;

DESCRIPTION OF THE PREFERRED EMBODIMENT

A. GENERAL DESCRIPTION OF ONE INTENDED USE OF THE INVENTION

Figure 3:
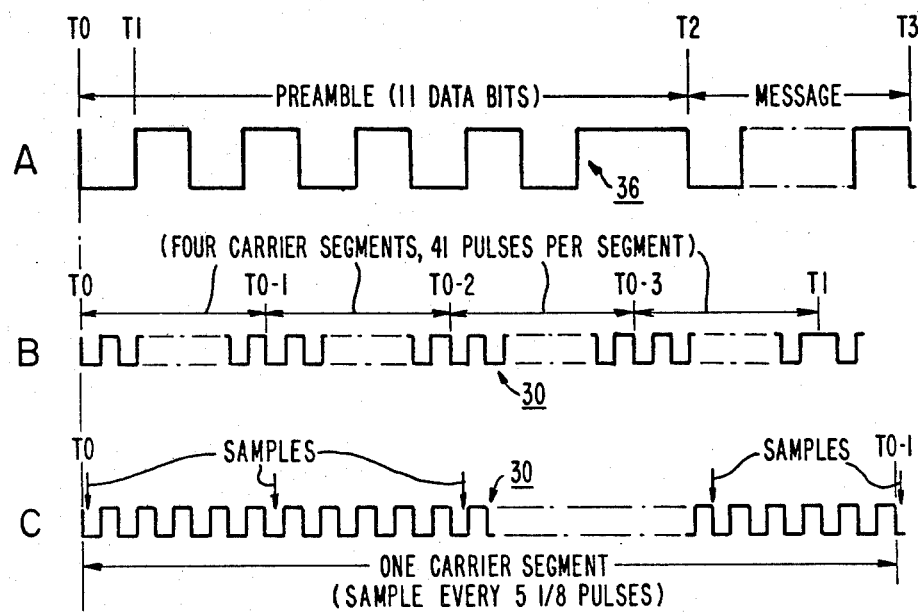
FIG. 3 includes graphs A, B and C illustrating baseband data signals and sampling characteristics provided in a carrier received and initially processed by the demodulator shown in FIGS. 1 and 2.

Referring now to the drawings and more particularly to FIG. 1, there is shown a communications terminal 10 including a receiver 12 provided between a power line carrier input 13 and a coherent phase demodulator 14 having an input 15 and made in accordance with the present invention. Before describing the demodulator 14, a description of the characteristics of the communication signals to be processed by the receiver 12 and phase demodulator 14 is made for providing a better understanding of this invention. The communications terminal 10 is intended, in one preferred embodiment, to be connected to a coupler 16 which is mounted in signal communication with at least one of the power line conductors 18. Such conductors are typically used by electric utilities to supply sixty Hz electric power to customer locations having the communications terminal 10. The coupler 16 is responsive to a power line carrier 20 conducted by the conductors 18 and intended to be received by the receiver 12. The carrier 20 includes phase modulated transmitted data information to be recovered by the phase demodulator 14 of this invention. As well known, the transmission of the carrier 20 in a power line communications system combines not only the carrier and the sixty Hz power, but also various interfering signal noise and extraneous signal frequencies. Also, various and random attenuation and impedance characteristics at the carrier frequencies of interest are found in distribution systems that can include the power line conductors 18 because of associated distribution equipment such as distribution transformers and power correction capacitors.

The phase demodulator 14 is intended for operation in a coherent phase shift keyed (CPSK) carrier communication system having binary data modulated phase reversals of a single sinusoidal carrier frequency or tone. The carrier waveform designated by the numeral 22 in FIG. 1 is a substantially ideal recovered form of the carrier 20 on the conductors 18 as it is phase reversal modulated with bipolar binary data bit message symbols included in a data transmission to be received by the terminal 10. Each data bit is coded as a zero or nominal carrier frequency or 180° phase reversal of the carrier frequency. The data bits are synchronized with the carrier frequency. Thus, equal carrier data bit intervals are provided which include equal numbers of cycles of the carrier so as to define a predetermined data rate. Although the data bit rate is synchronized to the carrier, neither the data bit rate nor the carrier frequency is required to be synchronized nor have any predetermined harmonic or subharmonic frequency relationship with the electric power frequency or any other synchronizing frequency or signal source for operation of the demodulator 14 in accordance with the present invention. By way of example and not limitation, one preferred range of carrier frequencies is about 9 to 15 kHz and one exemplary carrier signal frequency described herein is 12.5 kHz. With the frequency and data bit rate known at the demodulator 14, a unique method and apparatus for coherent demodulation is provided therein, as described in further detail hereinbelow.

The general requirements of the receiver 12 and the phase demodulator 14 are to detect the presence of the carrier waveform 22 in the carrier signals 20 of the power line conductors 18, determine the phase of the carrier signal with respect to a predetermined reference, provide synchronization with the beginning and end of each message symbol or data bit interval thereof, and correlate the transmitted polarity or binary logic state of each carrier data bit. To accomplish the aforementioned requirements, the receiver 12 is adapted to distinguish the carrier 22 frequency in the presence of the typical noise associated with transmission of the sixty Hz electric power and the extraneously induced noise of power line conductors 18. A high pass filter 24 is provided to initially reject sixty Hz power frequencies and to pass a carrier frequency of interest. A signal conditioning unit 26 further filters, conditions and amplifies the received signals so as to produce the substantially single frequency carrier waveform 22 with binary phase modulated coded data information therein. The circuit 26 typically includes a low pass filter to reject frequencies slightly above the carrier frequency and a diode clipper to remove spurious noise impulses. A further bandpass filter is included in the circuit 26, which in one preferred embodiment, has a bandpass bandwidth of approximately four hundred Hz with a center frequency of 12.5 kHz. Accordingly, the output of the circuit 26 is substantially the same sinusoidal carrier as initially transmitted or injected onto the conductors 18 in the presence of low noise. A zero reference axis 27 indicates the positive and negative half cycles of the sinusoid carrier waveform 22. The reconstituted carrier waveform 22 is applied to a hard limiter circuit 28 where the carrier signal is amplified and hard limited between about five volts DC and ground. This produces square or rectangular wave hard limited carrier signals 30, applied to demodulator input 15. The instantaneous high and low states of the signals 30 correspond to the positive and negative cycles of the carrier waveform 22. The carrier signal frequency and all of the phase reversal keyed data information originally modulating the carrier phase characteristics is found in the signals 30. The transitions of the signals 30 between the high voltage and low or zero voltage levels correspond to the carrier sinewave 22 passing between positive and negative half cycles or phases and therefore crossing at its zero axis 27.

The phase demodulator 14 processes the hard limited signals 30 in predetermined fragmentary portions or segments of the carrier. The segments, shown in FIG. 3, of the signal 30 are sampled to produce binary phase coded image signals (Si) by operation of the phase demodulator 14. Thus, a carrier segment is, by analogy, a fragment or "chip" portion broken away from the carrier and a phase image or replica is derived therefrom for processing to determine its phase angle characteristics. In the broad general aspects of synchronizing the demodulator for coherent operation, polarity samples of each carrier segment are converted to relative phase angles represented by vector signals at both a fundamental and double frequency of the carrier. The double frequency vector signals are averaged for several carrier segments to provide both a reference for phase detection of the vector signals representing a single segment and for use as a measure of the presence of the carrier second harmonic for carrier detection. Correlation signals derived from a phase detector described below are summed, compared and processed to accomplish carrier synchronization, data bit synchronization and data bit polarity ambiguity resolution to effect reconstituted binary data signals 32 at demodulator output line 33. The binary ones and zeros of the signals 32 represent the same binary data information as included in the transmitted carrier information. The data signals 32 in one contemplated use, are applied to a logic circuits 34 and 35 which may have one or more of the functions as generally described in U.S. Pat. No. 4,130,874, issued Dec. 19, 1978, for a load management terminal having plural selectable address formats for a power line communication system, when the terminal 10 is of the load management terminal type utilized for remote meter reading and remote load control at electric power customer locations.

B. GENERAL DESCRIPTION OF SIGNAL PROCESSING IN THE PHASE DEMODULATOR DIAGRAM SHOWN IN FIG. 2

Referring now to FIG. 2, there is shown a functional block diagram of the phase demodulator 14 which is described in connection with its operation to process the signals and vectors shown in FIGS. 3 through 8 and 11A and 11B. The graph A in FIG. 3 illustrates a time graph of the logic states of the binary base band data signals 36 prior to modulation as shown in the carrier waveform 22. The beginning of each carrier data transmission includes a preamble, shown between times T0 and T2, of eleven data bits which include nine alternate data bit zero's and data bit one's providing synchronizing data bits followed by two consecutive or double data bit ones which form polarity indicator data bits. At the end of the preamble at time T2, the beginning of the message information data portion of the data transmission starts. The overall length of the message is typically in the order of fifty to sixty data bits in length. The base band data signals 36 originate at a transmitter, not shown, and are used to phase reversal key or modulate a nominal carrier frequency to produce the phase modulated carrier.

The graph B in FIG. 3 illustrates one carrier data bit interval between times T0 and T1 in the hard limited carrier signals 30. Each of equal carrier data bit intervals begins and ends at a point where a phase reversal occurs if the binary state or logic of the data bit changes from that of the previous data bit. The initial portion of the preamble includes alternate polarity data bits to establish synchronization in the phase detector 14 as will become more apparent from the description hereinbelow. Four of the aforementioned carrier segments are included within each data bit interval as indicated at times T0, T0-1, T0-2, T0-3 and T1. The carrier segments are actually formed after polarity sampling operations and storage of a predetermined number of the polarity samples within the demodulator 14. The sampled segments are usually not coincident with the beginning of a data bit interval but are shown as such to simplify the description and relationship of the carrier segments and a data bit interval which is equal to the four carrier segments. In the graph C of FIG. 3, one of the four segments of graph B is shown as it is defined by eight samples produced by sampling pulses 37 provided in the phase demodulator 14 shown in FIG. 2.

The frequency (fs) of the sampling pulses 37 is substantially lower than the carrier frequency (fc) and is determined by the ratio fs/fc equals 8/(8N±1), in one preferred embodiment, where N is an integer. It is important that the ratio of fs to fc is different than an integer but not necessarily an integer ±⅛ so that each group of eight samples progressively sample a significant cycle period of the carrier. When N equals 5, the sampling rate occurs at every 5⅛ cycles of the carrier signal 30 to effectively sample every 45° of one complete cycle or three hundred and sixty degrees of the carrier signal but at a low sampling rate, i.e., fs equal to 2439 Hz. With four carrier segments per data bit interval, there are thirty-two sampling pulses for each data bit which equals a data bit rate of 76.2 bits per second. The aforementioned sampling rate occurs with one hundred sixty-four carrier cycled occuring during each data bit interval shown in the graph B of FIG. 3 and forty-one carrier cycles during each subdata bit segment. The samples of the hard limited carrier signals 30 are used to indicate the zero crossings of the carrier waveform 22 which defines the phase angle thereof and, therefore, a measure of the data information phase modulated therein.

Having described the general characteristics of the hard limited signal 30 applied to the input line 15 of the phase demodulator 14, further reference is made to FIG. 2 wherein a polarity sampling block 38 is shown to receive the hard limited signals 30. Polarity sampling of the signals 30 is controlled by the sampling pulses 37 supplied from a sampling pulse clock oscillator 40. The pulses 37 are also supplied to other parts of the demodulator for timing and synchronized control thereof. The high and low levels of the signals 30 are sampled with the occurrence of each of the sampling pulses 37 to produce a series of binary polarity indicating sample signals 43. Positive and negative carrier polarity indications are represented in the signals 43 as a bit stream of 1 bits or 0 bits, respectively. The bits of signals 43 are sequentially stored in an eight stage or bit cell storage register indicated as the binary phase coded image signal Si store block 44 in FIG. 2. The storage of the group of eight bit sample signals 43 generates and establishes one binary phase coded signal which is developed during the sampling of one carrier segment to complete effective sampling of one cycle of the carrier. Any bit transitions between a sample bit 1 and a sample bit 0 indicates a zero crossing of a carrier waveform 22 between the sample times. The binary phase coded signals are designated Si and are temporarily fixed or stationary phase images of the carrier segments. Accordingly, when adjacent bits are different in a data word defining the signal Si, there is indication of a zero crossing or phase reversal and these are indicated by the bit cell position of the bit transitions within a data word register defining the signal Si. Each of the sample bit positions within the signal Si is indicated by the same eight or octal count number of the sampling pulses 37 or the bit cell number from seven to zero, corresponding from the most significant bit (m.s.b.) to the least significant bit (l.s.b.) of a binary register. The sample bits of the signal Si are compared to determine adjacent bit transitions by a zero crossing detector 46 which detects the octal count of the sampling pulse and whether the transition is positive or negative, i.e. 0 to 1 or 1 to 0.

Figure 4:
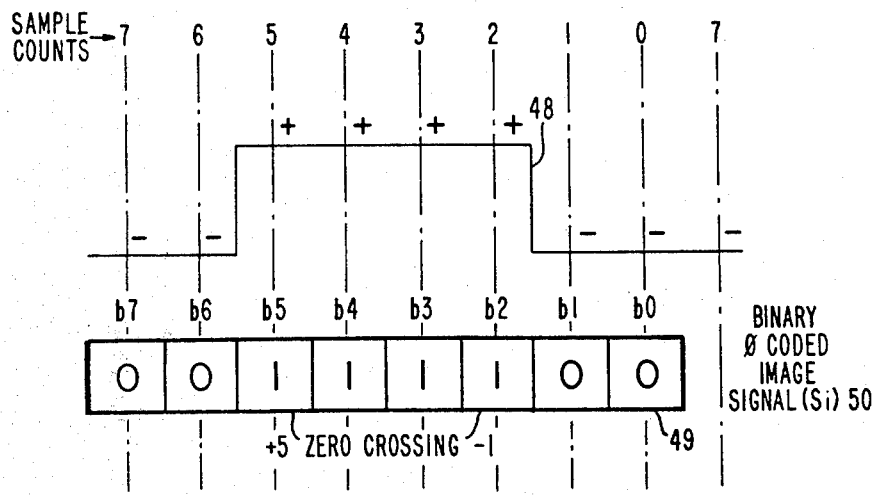
FIG. 4 is a graph illustrating the manner of storing sample signals derived from a carrier input and producing a resulting binary phased coded image signal in accordance with the operation of the demodulator shown in FIGS. 1 and 2.
Figure 7:
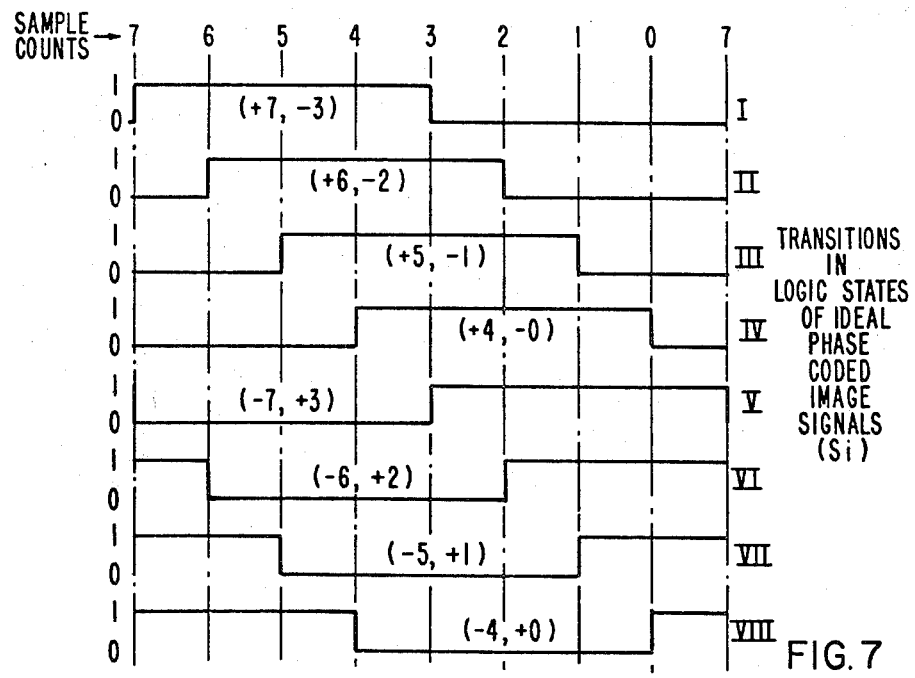
FIG. 7 is a graph of the binary logic states of eight different phase coded image signals relative to sample count values mutually aligned with the eight relative phase angle reference lines in FIGS. 5B and 6B.

Reference is now made to FIG. 4 which illustrates the aforementioned sampling process and is described before describing the remainder of the demodulator 14 as shown in FIG. 2 to aid in the understanding of the present invention as made herein afterwards. The signal 48 shown in FIG. 4 is a fictious or illustrative waveform of one cycle of signals 30 which is sampled during the eight sampling pulses of each carrier segment. As noted above, forty-one carrier cycles occur during the eight sample times or counts seven through zero shown as decreasing numerals above the illustrative signal 48. The initial polarity sample is shown at count seven and is negative and is stored as a bit 0 in the bit cell b7 of illustrative phase coded image signal (Si) 50. The sequentially occurring minus-minus-plus-plus-plus-plus-minus-minus signal polarity states occur with eight sampling pulses 37 and are stored as bits 00111100 in the bit cell b7 through bit cell b0 positions of a register 49 storing Si signal 50. The eight bit positions of the Si signal 50 and the octal sample counts are commonly identified by the same numerals 7, 6, 5, 4, 3, 2, 1 and 0. The transitions shown between the counts 6 and 5 and between the counts 2 and 1 shown FIG. 4 are detected as they are the zero crossings by a zero crossing detector 46 described further hereinbelow. The illustrative representations at the zero crossing detector 46 output are shown in FIG. 4 as a +5 indicating a positive transition at the sample count 5 and a −1 indicating a negative transition at the sample count 1. The illustrative signal at graph III in FIG. 7 is the same coded representation of the signal 50 having (+5, −1) at the zero crossing detector 46 output upon sensing the indicated zero crossings sample counts. The graph VII in FIG. 7 indicates an illustrative binary complement signal of opposite polarity from that shown in graph III in which case the corresponding signal Si, not shown, would indicate plus-plus-minus-minus-minus-minus-plus-plus polarity sample signals with a negative transition at count 5 and a positive transition at the count 1. Under ideal zero error conditions, the illustrative signals of the graphs III and VII of FIG. 7 can occur during carrier segments of oppositely coded data bits of the same carrier transmission. The sampling process in the demodulator 14 as just described, is continuous and the zero crossing indications of each phase coded signal Si are continually processed without interruption. Effectively, a stationary or static phase representation of a received carrier segment is accomplished by the aforementioned sampling and zero crossing detection.

Referring again to FIG. 2, a relative phase angle vector store 60 is shown for receiving the outputs from the zero crossing detector 46. The vector store 60 effectively includes in-phase I and quadrature phase Q components of eight octangular vectors V having a fundamental frequency equal to that of the received carrier and a double frequency or second harmonic vector V2 having twice the frequency of the received carrier. The output from the detector 46 is applied to the vector store 60 to produce V and V2 vector digital signals represented by corresponding in-phase and quadrature phase components of the stored vectors. One result to be achieved by the outputs of the vector store 60 is to provide a phase angle vector signal representing or corresponding to the relative phase angle of each zero crossing of a carrier segment, as represented by phase coded image signal Si, and to establish resultant phase angle vector signals Vi and V2i from all the zero crossings of a signal Si. Thus, the vector signals Vi and V2i represent a relative phase angle in both fundamental and second harmonic frequencies for each carrier segment for further signal processing in the demodulator 14, described more fully hereinbelow. It is noted that the various phase angles referred to herein can be represented either by a vector having a magnitude and angle in a polar coordinate system or as two vector components in a rectangular coordinate system referred to herein as the in-phase and quadrature phase components. It is to be kept in mind that it is the phase angle information represented thereby that is of particular importance in the present invention.

The stored values of the vectors V and V2 are the same for any frequency value fc of a received carrier frequency although the vectors are referred to as related to fundamental and second harmonic frequencies of the carrier. The vectors are effective for coherent operation so long as the sampling frequency fs is matched to the carrier frequency as described for the exemplary frequency 12.5 kHz above. The resultant vector Vi signals, for each carrier segment, will provide consistent relative phase angle reference indications so long as the groups of eight sampling pulses recurrently sample substantially exactly one complete cycle of the hard limited carrier signals 30. The vectors V and V2 are referred to as relating to "relative" phase angles since the beginning of the sampling process is unknown and can arbitrarily start at any instant or phase angle of the signals 30. Accordingly, cyclic groups of eight bit polarity sample signals 30 are converted to a corresponding relative phase angle, represented by resultant vectors Vi and V2i which are the sums of stored vector values, to provide an arbitrary phase angle reference indication. The particular phase angle values of the vectors are not critical but rather that the same or nearly the same vectors are produced for carrier segments of one carrier data bit polarity and substantially identical or nearly identical vectors shifted one hundred eighty degrees are produced for carrier segments of the opposite carrier data bit polarity. The explanations herein are directed to substantially error free operations but it is noted the approximation methods, comparison techniques, weighted averaging and summing operations included in the demodulator 14 are to optimumly produce accurate recovery of the carrier data bits and their polarity while accommodating errors and deviations from ideal signal conditions as typically found in power line carrier communication systems.

The double frequency or second harmonic vectors V2 are utilized to generate a reference vector VR over a large number of previously occurring carrier segments since the phase of the second harmonic does not change when the phase of the nominal carrier frequency is reversed due to the opposite phase encoding of a binary one and zero data bits. The second harmonic vector V2 rotates through two 360° cycles as the vector V rotates one cycle so that the V2 360° phase occurs at the 180° phase of the fundamental and the V2 zero phase is the same as the zero phase of the fundamental. The foregoing is illustrated in FIGS. 5A, 5B, 6A and 6B. The second harmonic vector V2 is further utilized to provide the carrier detection function. Detection of the carrier is by determining the spectral energy density distributed within the band pass filter reconstituting the carrier for processing by the demodulator 14. The spectral energy density detection is accomplished by the vector V2 in effect doubling the frequency of the input carrier and then the demodulator filters to determine the components of the second harmonic that are very close to the expected carrier frequency.

Thus, utilizing corresponding fundamental and second harmonic vector signals representing detected phase angles in carrier segments avoids processing the total number of incoming data signals and having a high frequency locally generated reference signal source commonly used in many prior phase demodulators.

Figure 5A:
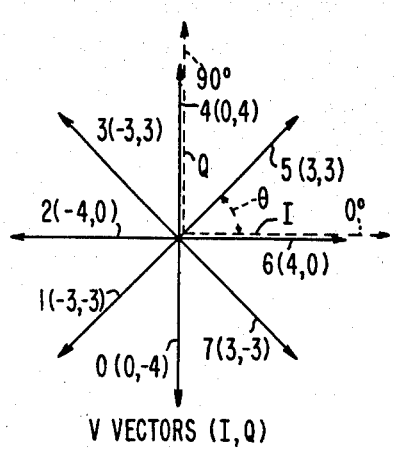
FIGS. 5A and 5B are graphs of fundamental frequency relative phase angle vectors and corresponding quadrature components thereof stored in the demodulator shown in FIG. 2.
Figure 5B:
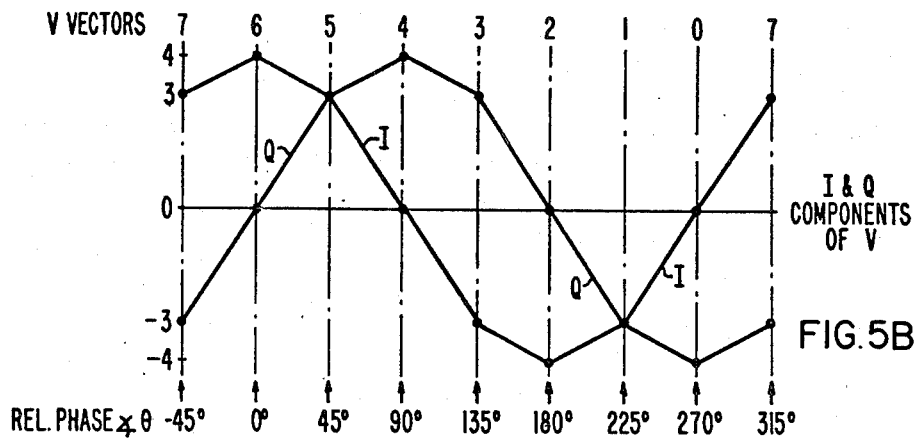

Reference to the graphs of FIGS. 5A and 5B is made to further describe the aforegoing and they illustrate the representative values of in-phase I and quadrature phase Q components of the fundamental relative phase angle vector V which are stored in the vector store 60 in FIG. 2. While vectors are referred to herein in describing the demodulator 14, they are represented by two ninety degree components having weighted values corresponding to their lengths along zero degree and ninety degree, I and Q, reference axes, respectively, to avoid representing the vectors as having lengths and angles. Approximate values are further used to define the components corresponding to a given vector as described further hereinafter. A vector V beginning at the zero degree axis of FIG. 5A and rotated counterclockwise through an angle $\theta$ to the eight octangular vectors indicated by numerals 0 through 7 is correspondingly defined by one of the weighted values of $-4$, $-3$, 0, $+3$ and $+4$ for an in-phase I and quadrature phase Q components in the corresponding graph of FIG. 5B. Interconnecting the values of I and Q produces a pseudo sinewave and pseudo cosine waveforms where I equals a pseudo $V \cos \theta$ and Q equals pseudo $V \sin \theta$ which are effectively the polar to rectangular coordinate transformations. The aformentioned two pseudo sinusoids are shown in FIG. 5B relative to eight vertical axis lines designated vectors V 7 through 0, and as relative phase angles spaced forty-five degrees apart. The vector lines 7 through 0 in FIG. 5B are indicated with respect to the in-phase I and quadrature phase Q reference axes of zero and ninty degrees, respectively. Thus, the vector 7 can be defined by the I and Q components thereof wherein I equals $+3$ and Q equals $-3$. The vector 7 is shown extending at minus forty-five degrees in the fourth quadrant of FIG. 5A. Correspondingly, the vector 6 is defined by the I and Q components when I = $+4$ and Q = 0 and the vector 6 is shown coaligned with the positive I zero degree axis. The two numbers in parentheses at each of the vectors in FIG. 5A are the I and Q component weighted values, respectively, of the associated vectors taken from the graph of the two pseudo sinusoids shown in FIG. 5B. Accordingly (3,−3) represents vector 7 and (4,0) represents vector 6. These values are approximations of a true sinusoid, but they have been found to be satisfactory and simplify the storage of the vectors. The vector component values indicated in the parentheses at each vector in FIG. 5A are stored in the vector store 60 to provide the I and Q component digital signals for each of the eight octangular vectors, occurring every 45°, of the fundamental phase angle vector V. Accordingly, the vectors 7, 6, 5, 4, 3, 2, 1 and 0 have stored in-phase I component weighted values of 3, 4, 3, 0, −3, −4, −3 and 0, respectively, and quadrature phase Q component weight values of −3, 0, +3, 4, +3, 0, −3 and −4, respectively.

Figure 6A:
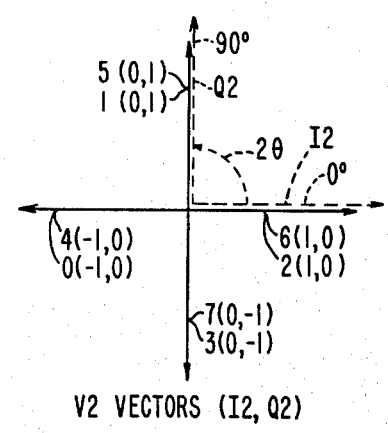
FIGS. 6A and 6B are graphs of second harmonic relative phase angle vectors and corresponding quadrature components thereof further stored in the demodulator shown in FIG. 2.
Figure 6B:
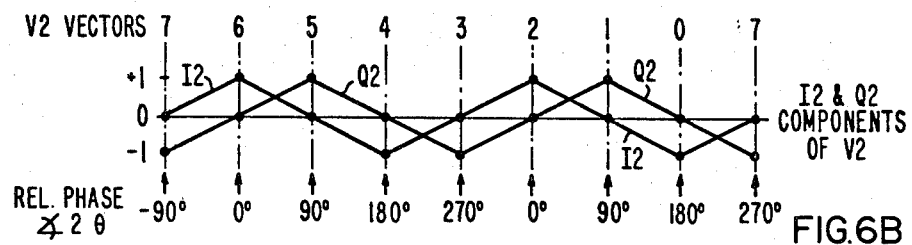

In FIGS. 6A and 6B, the double frequency or second harmonic relative phase angle vectors V2 are illustrated as represented by two pseudo sinusoids I2 and Q2 having two double frequency cycles compared to the single fundamental frequency cycle of I and Q shown in FIG. 5B. The corresponding vectors V2 7 through 0 are shown along the same vertical axis reference lines in both FIGS. 5B and 6B with the vertical axis reference lines representing ninety degrees or $2\theta$ in FIG. 6B. The connected values of I2 and Q2 in FIG. 6B may be considered as the pseudo cosine and sine components of V2 rotated through the single $2\theta$ cycle as follows: I2 equals pseudo V2 sin $\theta$ and Q2 equals pseudo V2 cos $\theta$ also defining a polar to rectangular coordinate transformation. The corresponding V2 vectors are shown in FIG. 6A with in-phase I2 and quadrature phase Q2 component axes zero and ninety degrees, respectively. The second harmonic V2 vectors 7, 6, 5, 4, 3, 2, 1 and 0 have the I2 component weighted values 0, +1, 0, −1, 0, +1, 0, −1, respectively, and the Q2 component weighted values −1, 0, +1, 0, −1, 0, +1 and 0, respectively. The V2 vector goes through seven-hundred twenty degrees for every three-hundred sixty degrees of the fundamental vectors shown in FIGS. 5A and 5B.

The zero crossing detector 46 shown in FIG. 2 has the outputs thereof applied to the vector store 60 which includes first and second lookup tables including the I and Q and I2 and Q2 weighted values, respectively, described above. The polarity bit transitions are identified by the corresponding octal sample counts, shown in FIG. 7, in the phase coded signal Si which will produce the corresponding in-phase I or I2 and quadrature phase Q or Q2 components of the fundamental and second harmonic vectors V and V2, respectively. Accordingly, in the example illustrated in FIG. 4, the +5 and −1 transitions will produce two sets of four vector component values with the two individual I components equal to +3 and −3 and the two individual Q components equal to +3 and −3. The sum of the I and Q component values are made at sum block 61 obtained for each phase code signal representing one carrier segment by adding the I component values together and adding the Q component values together and taking the negative of each I and Q component value for a negative going transition. Accordingly, the resultant Ii component for the exemplary single signal Si having transitions at counts 5 and 1 in FIG. 4 equals +3 minus −3 or +6 and resultant Qi for the signal Si equals +3 minus −3 or +6. The Ii and Qi components provide the components of a resultant vector Vi(Ii,Qi) having values (6,6) which would be at +45° between a Ii zero degree reference axis and the Qi ninety degree reference axis not shown but equal to twice the vector values shown in FIG. 5A. A further description of FIG. 7 hereinbelow indicates the method of converting the zero crossings to corresponding individual I, Q, I2 and Q2 component values.

The second harmonic vectors V2 are also determined from the outputs of the zero crossing detector 46 by taking a corresponding I2 and Q2 component value for each zero crossing and finding the corresponding vector from the sample count of the bit having a transition in the signal Si. Thus, in the example of FIG. 4, the two I2 values from the bit sample transitions at counts 5 and 1 each equal 0 so that their sum is made at sum block 62 and the resulting I2i value is equal to zero. The two Q2 values are summed for the Q2i for the signal Si. The octal counts 5 and 1 for Q2 are each +1 so that Q2i equals +2. The resultant phase angle vector V2i is not shown in FIG. 6A although it would coincide with vector 5 in FIG. 6A. Thus, the ideal resultant I2i and Q2i components of V2i are twice those shown in FIG. 6A. The second harmonic vector V2i(I2i,Q2i) is applied to a digital integrator 64 which provides a low pass filtering operation having a predetermined time constant equal, in one preferred embodiment, to four data bit intervals or sixteen carrier segments. The I2i and Q2i component values for V2i of each new signal Si are effectively integrated with fifteen prior V2i(I2i,Q2i) values so as to develop a weighted sum average representation of the received carrier at or near the second harmonic thereof. Thus, the digital integrator 64 is of the so-called "leaky integrator" type to give a low pass filter operation and provide smoothed output values. It is noted that after at least four carrier segments are processed the polarity of the fundamental vectors V and Vi will reverse during the synchronizing data bits of the data transmission preamble. Conversely, the I2 and Q2 component values will remain with the same polarity, as noted hereinabove, and therefore, the same signed values will continue to contribute to the weighted sum average outputs of the digital integrator 64. For the exemplary carrier segment described in FIG. 4, the V2i value of I2i=0 and Q2i=+2 will be integrated upward toward a theoretical V2avg. weight sum average value of Iavg.=0 and Qavg.=+32 with error free operation. This would produce a V2avg. along the ninety degree reference axis in FIG. 11A. The outputs of the digital integrator 64 are I2avg. and Q2avg. components having the weighted sum average values derived over a changing total of sixteen phase coded image signals Si which are equal to four data bits intervals. The values of the I2avg. and Q2avg. components for the eight V2avg. vectors 7 through 0 will be sixteen times the I2i and Q2i component values corresponding to the second harmonic vectors V2i, which are twice the values of FIG. 6A, so that for theoretically error free operations the I2avg. values are 0, +32, 0, −32, 0, +32, 0, −32, respectively, and Q2avg. values are −32, 0, +32, 0, −32, 0, +32, and 0, respectively. It is again noted that the above numerical values are weighted sum average values for giving relative phase angle vector representations and the demodulator 14 may use other values having corresponding weight values or magnitudes. Also, in actual operation the aforementioned theoretical values will not be produced and actual V2avg. vector signals will be generated within the plane shown in FIG. 11A or related plane of FIG. 6A and not aligned with either of the ± zero I2avg. or ± ninety degree Q2avg. reference axes.

The carrier detection block 66 includes means for calculating the approximate RMS (effective) or vector magnitude value of the V2avg. vector from the I2avg. and Q2avg. values produced by integrator 64. The carrier detection block 66 is further responsive to a predetermined threshold which is established, in one preferred embodiment, with respect to a substantially noise free operation so that when the RMS value of the V2avg. vector is calculated therein and exceeds the predetermined threshold, a carrier detect CD logic signal is provided at output 67 of the carrier detection block 66.

Figure 8:
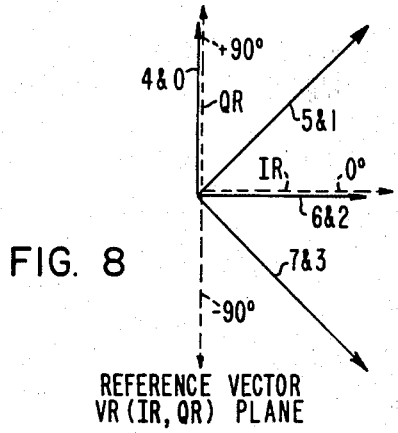
FIG. 8 is a graph of the vector plane of a reference vector VR and quadrature components thereof produced in accordance with operation of the phase demodulator shown in FIG. 2.

Having utilized the I2avg. and Q2avg. components for carrier detection, it is then necessary to convert these weighted sum average vector components into a reference phase angle vector VR having the components IR and QR at a vector angle divider indicated at block 70. The theoretical values for I2avg. and Q2avg. vector components indicated above, for purposes of description, have the same corresponding vector V2i angles as shown for the V2 components I2 in Q2 and FIG. 6A. Approximate half angle divided vector values Vavg. are calculated to produce VR values as described further hereinbelow with reference to FIGS. 11A and 11B wherein the actual V2avg. vector will be in the three hundred sixty degree plane of FIG. 11A and the corresponding VR vector will be in the ± ninety degree plane of FIG. 11B. In the theoretical example of I2i and Q2i the corresponding reference vector VR component IR and QR values are shown in FIG. 8. The IR component is established as always being positive in calculating the half vector angle values from the V2avg. vector component values I2avg. and Q2avg. and the IR and QR vector components are chosen to occur at the first and fourth quadrants also shown in FIGS. 8 and 11B with the IR reference axis taken along the zero degree axis as shown. The ninety degree quadrature phase reference axis QR is shown at +90° from the 0° reference axis IR. The theoretical values for the IR and QR components of the theoretical VR vectors 7, 6, 5, 4, 3, 2, 1 and 0 in FIG. 8 are shown as calculated from the theoretical I2avg. and Q2avg. components being along the same vector number axis in FIG. 6A as described above. Accordingly the theoretical VR vectors 7 through 0 produce IR component values of +32, +32, +32, 0, +32, +32, +32 and 0, respectively, and QR component values of −32, 0, +32, +32, −32, 0, +32 and +32, respectively. Because of the ambiguity which can occur in the vector half angle divider calculations, a correction is provided for when the Q2avg. component passes through one-hundred eighty degrees where the corresponding QR component may flip between ± ninety degrees and the corrections for such ambiguities are described further hereinbelow in connection with the description of FIGS. 9B and 11B. It is an important feature of the present invention that the IR component values are always positive.

The output of the vector angle divider 70 produces the reference phase angle vector VR represented by the IR and QR component values which are developed upon the basis of the aforementioned weighted sum average values of sixteen prior values of V2i vector components. A phase detector 76 receives the resultant Vi vector components Ii and Qi values for a single signal Si representation of a carrier segment and the reference VR vector components IR and QR values. Separate multiplication of the inputs produces at its output line 78 a sum of the products of (Ii×IR)+(Qi×QR). The phase detector output 78 produces a correlation of the phase angle vector Vi(Ii,Qi) and the reference phase angle vector VR(IR,QR). The ±M correlation signals 77 at the detector output 78 are designated +M or −M and each provides a measure of same or opposite polarity of the resultant relative phase angle representation of the vector Vi(Ii,Qi) being the same or 180° opposite from the reference phase angle representation of the vector VR(IR,QR). The correlation signals 77 typically have large numerical values or magnitudes and an associated plus or minus sign when low error operation occurs to provide the manifestations of the exactly in-phase and completely out of phase relationships of component representations of the phase angle vectors Vi and VR or the degree of positive and negative correlation of the phase detector inputs.

FIG. 7 includes a graph of eight ideal phase coded image signals Si having eight different phase relationships with two different zero crossings in each. In the example shown in graph III of FIG. 7 and in FIG. 4, the ideal correlation signals 77 are computed by the detector 76 as described hereinafter. The Ii and Qi component values are +6 and +6, respectively, as produced by the sums of the two vector components I and Q as described hereinabove. The multiplication of Ii×IR is (6×32) and equals 192. The multiplication of Qi×QR is (+6×32) or 192, the M correlation signal value is +384. Similar calculations for recurring error free operation of theoretically ideal values for signals Si in graphs I, II, III, IV, V, VI, VII, and VIII in FIG. 7 will provide ±M correlation signal 77 values of +384, +256, +384, +256, −384, −256, −384 and −256, respectively. The values are again noted as being arbitrary weighted values which can be varied by different selections of weighted values for the vector component values described above. In a preferred embodiment, the phase detector 76 output correlation signals 77 are data words formed by an eight bit signed binary number in two's complement. Thus, the m.s.b. bit b7 of the correlation signal data word signal is a logic 1 or logic 0 for negative (−) and positive (+) signs, respectively, of the ±M correlation signals 77.

GENERAL DESCRIPTION OF THE DATA BIT SYNCHRONIZATION AND SIGN CORRELATION OPERATIONS IN FIG. 2

The foregoing description includes the manner of providing carrier detection and the phase detection of each phase code image signal Si for each carrier segment derived vector Vi(Ii,Qi) with respect to the reference vector VR(IR,QR) derived a weighted vector sum average of sixteen values of the V2i(I2i,Q2i) vector signals so that in practice the values thereof vary slightly with each new V2i(I2i,Q2i) signals. The phase detector 76 correlation signals 77 must be combined as indicated by the block 84 so as to produce the proper sum of four of the signals 77 that correspond to the sampled segments contained in a carrier data bit interval being processed. The data bit synchronization operation indicated by block 86 generates the correct groups of four correlation signals 77 to form them into a combined sequence of the signals 77. The block 84 produces an algebraic sum or integrated weighted sum value for the proper group of four signals 77 designated correlation sum (±M-sum) signals 87. Further, when the correct sequence of four correlation signals 77 are synchronized with a carrier data bit interval, the data bit logic state must be correlated to the sign of the correlation sum signals 87 so that the sign of the detected data bit in the demodulator corresponds to the binary one and binary zero logic states of the data bits transmitted in the carrier.

The double polarity indicator data bits at the end of the data transmission preamble are used to provide the data bit sign correlator operation shown in block 92 described hereinbelow. Each of the detector correlation signals 77 is applied to a phase ($\phi$) detector output sum block 84 having four storage registers connected in a ring fashion. After carrier detection signal CD is received, the correlation signals 77 may be sequentially stored in the registers of block 84. With each correlation signal 77 applied to the registers at block 84, it is algebraically summed with the previous three signals 77 and the resultant ±M-sum signals 87 is stored in M-sum store indicated by block 88 which also has four storage registers connected in a ring fashion receiving and accumulating the absolute or unsigned values of the four ±M-sum correlation sum signals 87 produced from in the block 84. The registers of the M-sum block 88 reach a maximum value and initiate a reset operation to a counter control in the bit synchronization block 86. Reset is produced every time the M-sum signal in block 88 is higher than any of the previous M-sum signals so that after receiving several correlation sum signals 87, the groups of four correlation signals 77 are detected which produce the largest or maximum values when added together, and the bit synchronization is established and is maintained by a sequence counter in block 88 and described in particular detail hereinbelow. The bit synchronization process is terminated after the maximum of the absolute sums of the correlation sum signals 87 reach a predetermined threshold. This bit synchronization is typically accomplished within four to five preamble data bits after carrier detection.

The signs of M-sum signals 87 corresponding to a data bit interval are placed in the data bit sign correlator 92 block as it is synchronized with each associated received data bit interval. When the two polarity indicator data bits of the preamble are received, the signs of the two corresponding M-sum signals 87 are compared and if the M-sum signs are positive, the data bit sign correlator 92 reverses the output of the M-sum in store 88 as it passes to the data output block 96. In the case where the signs of the M-sums signals are negative, the data bit sign correlator 92 will not invert the output of the store block 88 as it passes to the data output 96. As an illustrative example, two M-sum signals 87 are chosen to have the theortical signed values of −192 and −192 when the polarity indicator data bits occur, each being a binary one. Accordingly, the sign correlator 92 will cause the signs of all the following M-sum signals to be reversed so that the output 96 produces binary data signals 32 which are high and low binary states when +M-sum and −M-sum, respectively, signals 87 occur at the output 96. Thus, the demodulator output data signals 32 correspond to the base band binary coded data bits transmitted in the received carrier. Typically, the output data signals 32 are not produced until the end of the preamble which indicates a start of the information carrying portion of the transmitted message.

C. DESCRIPTION OF THE DETAILED DIAGRAMS OF FIGS. 9A, 9B AND 9C AND THE CIRCUIT DIAGRAM OF FIG. 12

Figure 9A:
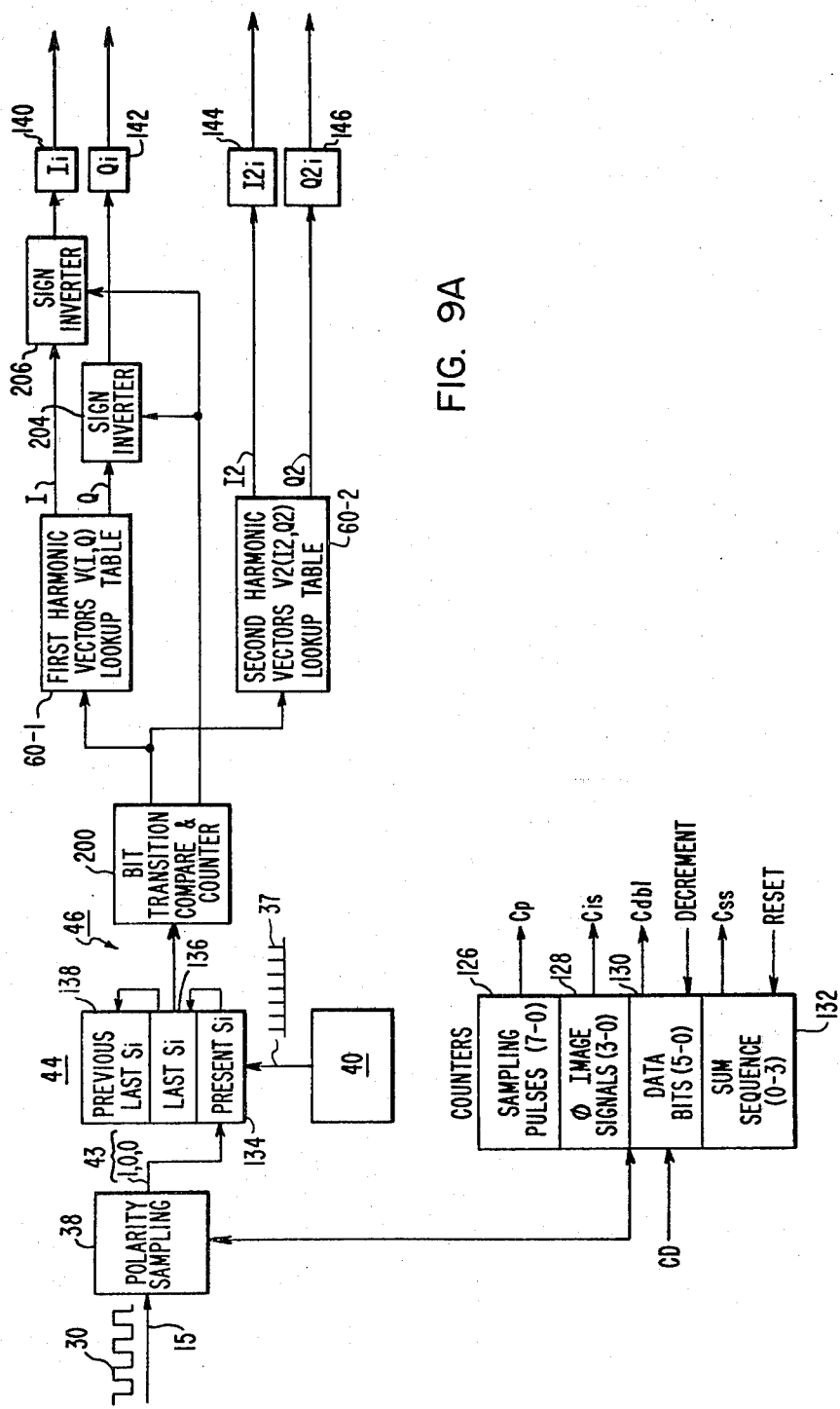
FIGS. 9A, 9B and 9C are detail block diagrams of the phase demodulator shown in FIG. 2.
Figure 9B:
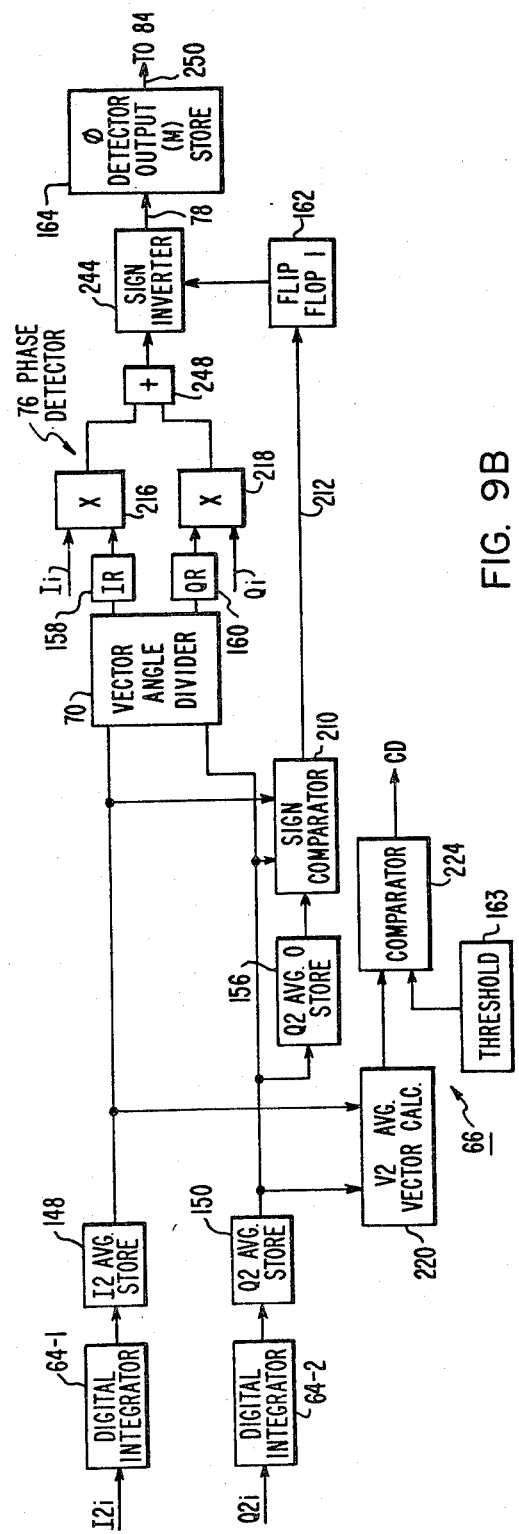
Figure 9C:
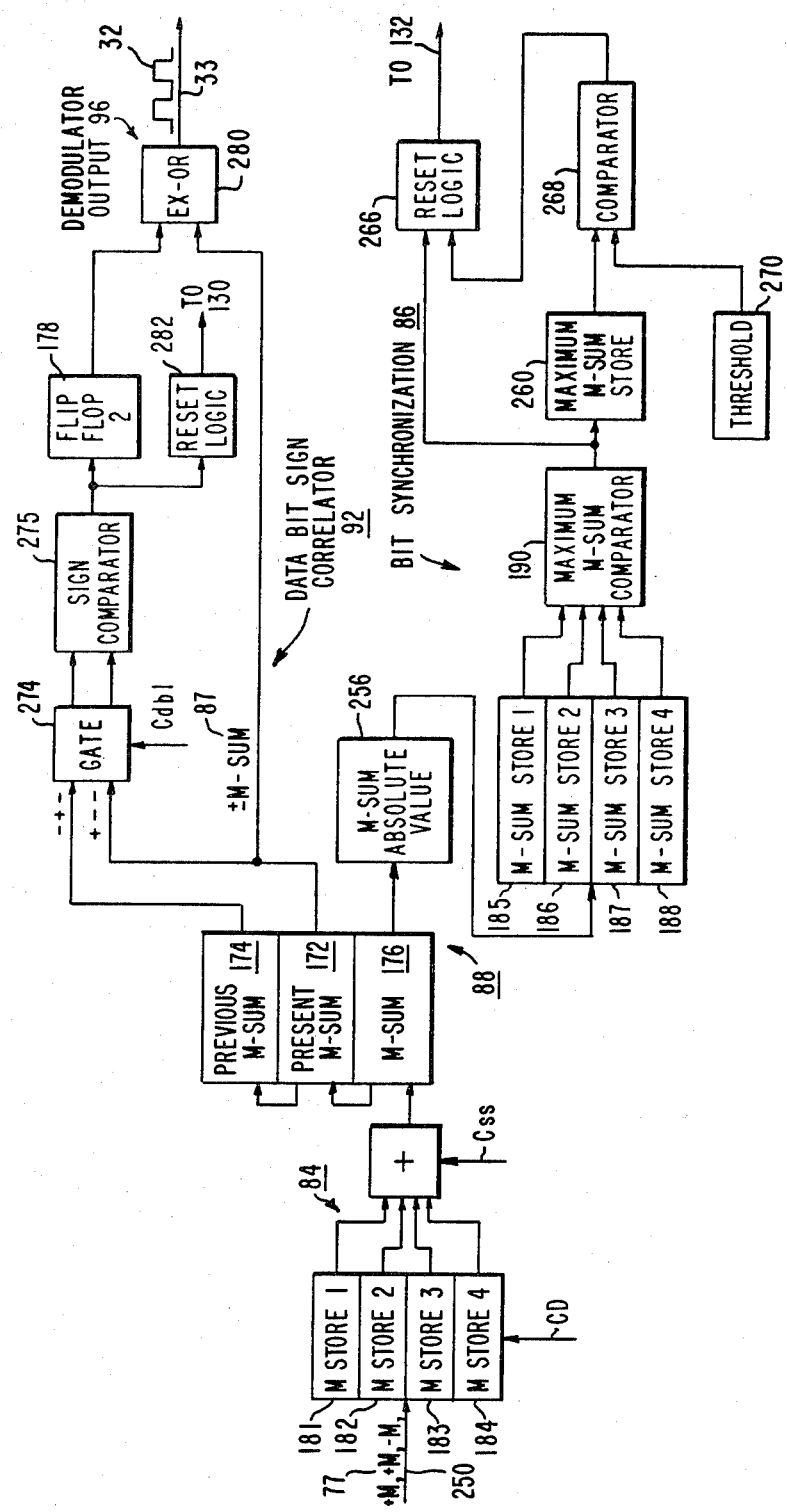

FIGS. 9A, 9B and 9C are detailed block diagrams of the coherent phase demodulator 14 shown more generally in the block diagram of FIG. 2. The diagrams of FIGS. 9A, 9B and 9C correspond to one implementation of the invention which is made by use of a microprocessor base system shown in FIG. 12 including a microcomputor system 108 of the 6800 series type available from Motorola Semiconductor Products, Inc. The use and description of such a microcomputer system is described in the M6800 Microprocessor Application Manual and in the M6800 Programming Reference Manual (M68PRMD) dated November 1976 and available from the aforementioned Motorola Semiconductor Products, Inc. A CPU unit 110 has a known architecture as generally shown in U.S. Pat. No. 4,145,761 and is operable in accordance with the aforementioned publications to provide the signal processing of the carrier demodulation as described hereinbelow. A read-only memory (ROM) 112 is provided with a program memory having a pre-programmed sequence of operating instructions stored therein for effecting the operation described herein. A random access memory (RAM) 114 is provided and includes a plurality of eight bit (bit b7 through bit b0) addressable read write memory registers for providing binary data storage utilized in the signal processing for providing the novel operation of the demodulator 14. A crystal controlled timer oscillator module 116 has a programmable divider for providing the clock oscillator 40 and the predetermined frequency of the sampling pulses 37 at frequency fs, which is integrally related in a synchronizing relationship to the carrier frequency fc as noted hereinabove. The sampling pulses 37 are selectively applied through the data I/O ports 118 to the non-maskable interrupt NMI input 120 of the CPU 110. The timer module 116 also provides the timing control signals for the timing the operation of the CPU 110.

The hard limited carrier signals 30 are applied from the receiver 12 to one of the data I/O ports 118 of the CPU 110. The present invention relies on the method and results and novel operative functions as described in detail herein rather than the particular sequence of programmed operations as utilized in the programed instructions of the ROM 112. Each of the operative steps and operations as described in the description of the FIGS. 9A, 9B and 9C, which are in accordance with the aforementioned description of FIGS. 1 and 2, can be formed by separate logic circuit components as well understood by those skilled in the art.

Certain memory storage registers are referred to in the description of the FIGS. 9A, 9B and 9C and are to be understood to be provided in the RAM 114 and are described hereinafter. The addressable data word registers described below have data and signal values as utilized for operation of the demodulator 14 when the description of FIGS. 9A, 9B and 9C is made hereinbelow. The registers are as follows:

Sampling pulse counter register 126 (FIG. 9A) counts eight sampling pulses in the manner of a Modulo-8 ring counter by being decremented from count seven to count zero upon the occurrence of each one of polarity sampling pulses 37. As the register 126 is decremented to the zero value, an indication in the output Cp is provided that eight polarity samples of the hard limited carrier signal 30 has been completed.

Phase ($\phi$) image signals Si counter register 128 (FIG. 9A) counts each group of four phase coded image signals Si in the manner of a Modulo-4 counter by being decremented from count three to count zero. When the register 126 reaches zero count the register 128 in decremented by one count. Upon reaching the count of zero in the register 128, four Si signals are detected so as to indicate at the output Cp that four carrier segments equal to one data bit interval have been sampled.

Data bits counter register 130 (FIG. 9A) counts the data bits in the preamble after carrier detection has occurred and has a maximum count of five. The count five is decremented to count of one to provide a delay for determining the bit synchronization with the carrier data bit intervals prior to initiating the data bit sign correlator operation. The sign bit correlator operation is initiated by output Cdbl prior to the tenth and eleventh double binary one data bits providing the aforementioned polarity indicators in the preamble. When the sign bit correlator is completed, the register 130 contents are decremented to have a negative value for indicating that the bit synchronization and data sign bit correlator operations have been completed.

Sum sequence counter register 132 (FIG. 9A) counts from a count 0 to count three in the manner of Modulo-4 counter and increments each count when register 128 decrements a count but will be at an offset count therefrom. The register 124 indicates which of four correlation values M is the beginning of a data bit and is to be summed in an M-sum value in the bit synchronization operations referred to by numeral 88 in FIGS. 2 and 9C and is described in more detail hereinbelow.

Present binary phase image signal register 134 (FIG. 9A) operates as a currently accumulating shift register store to sequentially store polarity sample bit signals 43 as they occur with each of the sampling pulse times of the hard-limited carrier signal 30. The loading of eight sample bits in the register defines a binary phase coded image Si which is phase representation of a one-fourth segment of the carrier data bit interval.

Last binary phase image signal Si register 136 (FIG. 9A) is a temporary store of the last complete eight sample bits which were loaded into the register 134. The bit cell position within the register 136 corresponds to the corresponding sample count for indicating the sample count of a bit logic transition and a carrier signal zero crossing.

Previous last binary phase image signal Si register 138 (FIG. 9A) is a temporary store of the binary image signal Si which was prior to the binary image signal Si presently stored in the register 136 and the l.s.b. b0 position in this register is compared with the m.s.b. b7 position in the register 136 to detect a bit transition occurring at the m.s.b. bit b7 position.

First harmonic vector V(I,Q) (FIG. 9A) lookup table register 60-1 (FIG. 9A) stores eight binary values for each I and Q vector component corresponding to the approximate weighted values shown in FIGS. 5A and 5B.

Second harmonic vector V2(I2,Q2) (FIG. 9A) lookup table register 60-2 (FIG. 9A) stores eight binary values for each I2 and Q2 vector component corresponding to the approximate weighted values shown in FIGS. 6A and 6B.

Ii and Qi registers 140 and 142 (FIG. 9A) store the sums of the I component values and Q component values derived from the zero crossing detection of each binary image signal Si generated for each carrier segment.

I2i and Q2i registers 144 and 146 (FIG. 9A) store the resultant relative phase angle component sums of the I2 component values and Q2 component values derived from the zero crossing detection of each binary image signal Si generated for each carrier segment.

I2avg. and Q2avg. registers 148 and 150 (FIG. 9B) store the I2avg. and Q2avg. weighted sum average vector component values in double precision binary numbers resulting from digital integrator operations to effectively provide low pass filtered smooth values of the I2i and Q2i component values over a time constant of sixteen image signals Si where the digital integrators sum 15/16 of each of the succeeding I2i and Q2i values and adds them to the current I2i and Q2i vector component values, respectively. The values of registers 148 to 150 vary slowly in actual operation of the demodulator 14 so that sudden changes of I2i and Q2i do not abruptly change the prior weighted sum averaged values of the measure of the second harmonic content of the received carrier. Q2avg.0 register 156 (FIG. 9B) stores the previous high order byte binary value of Q2avg. and is used for comparison with a present high order byte binary value of Q2avg. to determine if a change occurred in Q2avg. at the minus 180° reference axis to resolve ambiguity in the vector angle divider operation.

IR and QR registers 158 and 160 (FIG. 9B) store the IR and QR component binary values of the reference vector VR produced by the vector angle divider operation.

V(I,Q) lookup table registers 60-1 (FIG. 9A) include the eight weighted values for each of the I and Q components as shown in FIGS. 5A and 5B.

V2(I2,Q2) lookup table registers 60-2 (FIG. 9A) include the eight weighted values for each of the I2 and Q2 components as shown in FIGS. 6A and 6B.

Flip-Flop 1 register 162 (FIG. 9B) is a flag register and stores either binary 1 or 0 to adjust for sign changes in the Q2avg. vector component for changes across the minus 180° reference axis in the vector angle divider operation. The logic state of the register 162 inverts the sign of the correlation signal output of the phase detector 76 to correct for the vector calculation for angle divide ambiguities.

Threshold register 163 (FIG. 9B) stores a threshold value for the carrier detection operation which is established as a predetermined level for comparison with the RMS (effective) V2avg. value to initiate a carrier detect CD logic signal.

Phase detector output (M) store register 164 (FIG. 9B) stores the correlation signals 77 output of the phase detector 76 which is the correlation of vectors Vi and VR determined by the sums of the signed four quadrant multiplication of I times IR +Q times QR for each binary image signal Si. The value in the register 164 is a signed binary number in two's complement so as to provide a sign and magnitude representation of the positive and negative correlation.

Present M-sum register 172 (FIG. 9C) stores the current M-sum signal 87 including the sign and magnitude binary value of the sum of four correlation signals 77 from phase detector 76.

Previous M-sum register 174 stores the sign and magnitude of the last M-sum value stored in the register 172 previous to the present M-sum value in the register 172 for comparison of the m.s.b. b7 or sign bits of the data word registers 172 and 174 utilized in the sign bit correlator operation.

M-sum store register 176 (FIG. 9C) stores the sign and magnitude values of the current signals 87 derived from summing registers 181 through 184. During the bit synchronization operation, the values of each sum of four consecutive correlation signals 77 are converted to absolute values to be compared so that the M-sum values are synchronized with a carrier data bit interval to establish the bit synchronization.

Flip-Flop 2 register 178 (FIG. 9C) is a flag register and stores either binary 1 or 0 to correspond to the known binary one states of the double polarity indicator data bits in the transmitted preamble with the positive (+) and negative (−) signs of the M-sum signals 87 of the two consecutive groups of four correlation signals 77 having M-sum signals 87 with the same signs at the tenth and eleventh carrier preamble data bits.

M-store 1, 2, 3 and 4 registers 181, 182, 183 and 184 (FIG. 9C) are four storage registers for sequentially storing the last four correlation signals 77 values (±M) as they occur sequentially in the register 164. The sums of these four registers provide the proper M-sum signal 87 values after bit synchronization.

M-sum store 1, 2, 3 and 4 registers 185, 186, 187 and 188 are four storage registers which are sequentially loaded with the different consecutive M-sum signals 87 from the four registers 181, 182, 183 and 184. The binary values in the registers 185 through 188 are absolute values rather than signed values. The one of the registers 185, 186, 187 and 188 having the largest or maximum M-sum signal value is detected to indicate a corresponding M-sum signal group of correlation signals 77 which correspond to a data bit interval as detected in the data bit synchronization operation.

Maximum M-sum store register 260 (FIG. 9C) stores the totalized values of the accumulated maximum absolute M-sum values found when summing the four consecutive correlation signals 77. The maximum M-sum value corresponds to the maximum value in the one of the registers 185 through 188 which has the highest value which continues to be accumulated in one of the registers 185 through 188. When a predetermined threshold value is reached in register 260, the data bit synchronization operation is stopped.

Figure 12:
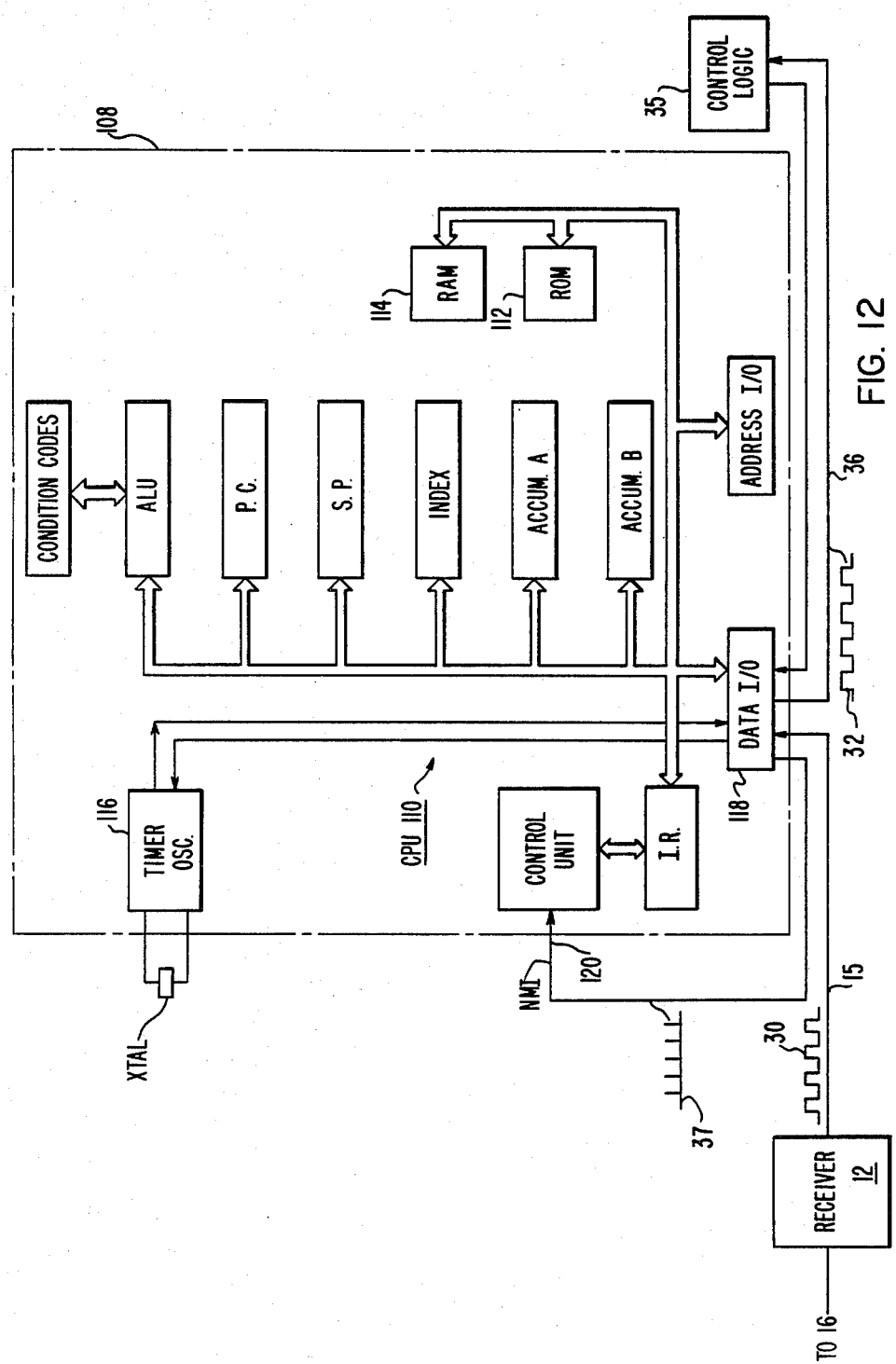
FIG. 12 is a block circuit diagram of one preferred embodiment of the system including the demodulator operated in accordance with the diagrams of FIGS. 2 and 9A, 9B and 9C.

Reference is now made to FIGS. 9A, 9C and 12 where the operations of the phase demodulator 14 are shown including the previous general descriptions thereof with respect to the earlier noted established relationship and characteristics of the phase angle vector components and the carrier signals shown in the FIGS. 3 through 8 utilizing the RAM 114 data registers, as described immediately hereinabove, and having a sequence of operation as controlled by the stored program instruction data provided in the ROM 112. Accordingly, the hard limited carrier signals 30 are shown in FIG. 9A as being applied to the polarity sampling block 38. The sampling pulses 37 are applied from the sampling phase source 40, as previously noted, to provide the polarity sampling operation of the received inputs to the demodulator 14. The sampling operation is continuous whether or not a carrier is received. In FIG. 12 the hard limited carrier signals 30 are applied to the most significant bit D7 data I/O port 118 of the microcomputer system 108. The sampling pulses 37 are generated at the timer oscillator 116 at the programmed frequency fs and applied to the NMI input. The CPU 110 initiates the non-maskable interrupt routine so that the voltage level at bit D7 of port 118 is sensed. The program sequence of operation of the CPU 110 starts a main sequence of operation wherein the polarity of the signal applied to the I/O bit D7 input is sensed at each sampling pulse time. The high and low voltage states produce corresponding binary one or zero sample bit signal 43 results. The bit samples are shifted into the first stage or l.s.b. bit cell b0 position of the register 134 in FIG. 9A which is organized as shown in FIG. 4. The sampling pulse counter register 126 is decremented by one and the main sequence of operation ends waiting for another sampling pulse 37 to effect another input to the NMI input of the CPU 110. The above sequence of operation is repeated with each of the sampling pulses decrementing the register 126. When the count of zero in register 126 is reached, the sequence of operation transfers the binary data in the register 134 serially into the last signal Si register 136. The count of the counter register 128 is decremented to indicate that a complete binary phase coded signal Si has been received and stored in register 138. At this time the previous last signal Si will have the next to the last signal Si stored in the register 138, the last signal Si stored in the register 136 and the register 134 will be accumulating sample bits to derive a new signal Si from the next eight sample bits.

The aforementioned sampling operations occur whether or not the carrier 22, shown in FIG. 1, is being received. Noise and other line perturbations will cause random sequences of high and low signal levels to be generated on the input 15. This will cause random binary 1's and 0's to be produced at the sample bit signals 43. These will be compared for zero crossings and corresponding I, Q, I2 and Q2 relative phase angle vector component values will be generated and summed to produce Ii, Qi, I2i and Q2i values for each group of eight sample bits. The demodulator 14 will not reach the carrier detection state since the digital integrators 64-1 and 64-2 in FIG. 9B will provide random positive and negative I2avg. and Q2avg. weighted sum average values so that the RMS vector V2avg. values will not reach the carrier detection threshold value at register 163 to initiate the carrier detect logic signal CD. Accordingly, the description hereinafter of FIGS. 9A, 9B and 9C and 11 will be respect to the demodulator 14 initially receiving the aforementioned preamble of a data transmission phase modulating a received carrier to produce the hard limited signals 30.

So long as the calculated RMS values of V2avg. are below the carrier detection threshold, the demodulator registers are returned to initialized conditions such as by clearing or setting to zero the Ii, Qi, I2i, and Q2i registers 140, 142, 144 and 146 and setting the counter registers 126, 128, 130 and 132 to initial counts. The operation of the zero crossing detector 46 is performed by bit transition compare and counter operations indicated by the block 200 in FIG. 9A and starts by loading contents of the previous last Si register 138 into the accumulator A of CPU 110 and the index register is loaded with the address of a first RAM 114 register in lookup tables for I and Q in store 60-1 plus an offset count of +7 for addressing the first RAM 114 register in the lookup tables for I2 and Q2 in store 60-2. The eight stored weighted values in the RAM registers for I, Q, I2 and Q2 are as described in connection with the description of FIGS. 5A, 5B, 6A and 6B. The first addresses of the lookup tables of store 60-1 and 60-2 correspond to the sample counts equal to seven in the last named FIGS.

5A and 5B. The register of last Si store 136 may have a stored binary value as shown in FIG. 3 for purposes of explanation. For comparing the adjacent binary one and binary zero states in the RAM register Si store 12 the m.s.b. bit b7, corresponding to sample count 7, is tested to compare whether its 1 or 0 state is the same as the l.s.b. bit b0 of register store 138. The contents of the register store 136 are loaded into a temporary register of RAM 114 and then the register store 136 is shifted one bit to perform individual comparisons of adjacent bits as originally stored in store 136. The comparisons are done by an exclusive-OR instruction looking at the m.s.b. b7 of the two registers so the exclusive-OR result is a 0 or 1 indicating adjacent bits are different or the same, respectively. If the polarities of the sample bits in the Si signal are the same, thereafter the register store 136 is sequentially shifted to the left in a rotate left operation and the previous contents of register 136 are loaded in the temporary register to again sequentially test the polarities of two adjacent sample bits. Each time two adjacent sample bits of register are the same, the index register is decremented so that the I, Q, I2 and Q2 lookup tables are addressed to output the vector component values corresponding to the next sample count if the next adjacent sample bits are different indicating a zero crossing. The zero crossing detector operation noted hereinabove is controlled at the machine clock frequency of the CPU 110 and occurs very rapidly between the times of the sampling pulses 37, utilizing the indexed addressing mode in the CPU 110 for pointing to the RAM address of the I, Q, I2 and Q2 and then decrementing the index register after each of the eight exclusive-OR bit tests for each signal Si and further utilizes the index register as a counter to match the sample counts of the bit samples in each signal Si to the corresponding I, Q, I2 and Q2 vector table values.

As an example of the above description, when the polarity of adjacent bits of the register store 136 are different, as at the sample count 5 and sample count 1 positions in FIG. 4, the vector component values are selected from the lookup table registers 60-1 and the 60-2. To read out the I2 and Q2 vector components, the address of the registers 60-2 are determined by adding an offset 10 and 11 to the address of the registers 60-1, which produce I and Q values, to produce the I2 and Q2 components. Thus, one address pointer in the index register is used to produce both I and Q and I2 and Q2 values. After each sample bit transition is determined, the polarity of the compared sample bit is tested whether positive or negative to establish if the polarity is negative and that a negative bit sample transition is present. If there is a negative bit transition, the lookup table values for I and Q are negated which is indicated at the sign inverter blocks 204 and 206 in FIG. 9A. Then the I and Q values are added to the I and Q registers 140 and 142 to produce the sum operation at block 61 in FIG. 2. The I2 and Q2 values are directly accumulated in the registers 144 and 146. Thus, by the aforementioned operation the output of the zero crossing detector functionally produces two outputs, one being the sample count of the bit transition in the phase image signal Si and the other an indication of the direction of the transition by indicating a polarity associated with the sample count for producing the corresponding V(I,Q) and V2(I2,Q2) lookup table values.

As noted above, after each of the exclusive-OR sample bit compare operations the index register of CPU 110 is decremented and if it is not equal to zero, the above process is repeated. If the index register is equal to the lookup table I and Q register address minus one, the zero crossing detector operation for the eight sample bits of each image signal Si is finished and the value in the signal Si register 136 is transferred into the signal Si register 138. At this time resultant sums of I and Q for the signal Si derived from the eight sampling bits are stored in the Ii and Qi component register stores 140 and 142. Similarly, in accordance with the sequence of operations described hereinabove, the sums of the I2 and Q2 values as selected from the second harmonic vector component lookup table, are accumulated in summed register stores 144 and 146 having the I2i and Q2i components.

Reference is now made to FIG. 9B wherein the signal processing described above will be assumed to be occurring with initial carrier data transmission including the aforementioned preamble. In order to accomplish carrier detection, the I2i and Q2i vector components are applied to digital integrators indicated at 64-1 and 64-2 performing the aforementioned low pass filtering and "leaky integrator" operation as noted hereinabove for producing a weighted sum average second harmonic vector V2avg.(I2avg.,Q2avg.) established over a sixteen carrier segment time constant. The digital integrator results from the blocks 64-1 and 64-2 are stored in the aforementioned I2iavg. component register store 148 and the Q2iavg. component register store 150. The integration of the double precision Ii and Qi quantities for sixteen signals Si are calculated by an approximation method wherein the present values of the I2iavg. and Q2iavg. are replaced by the current values of the I2i and Q2i plus 15/16 of the previous I2avg. and Q2avg. component values. As noted hereinabove, the I2i and Q2i component values which are applied to the digital integrator operations are usually long strings of signed eight bit binary data word values of the same weighted number such as either plus 2, minus 2 or zero with noise free carrier input. Thus, the I2avg. and Q2avg. weighted sum average values determined by the digital integrators 64-1 and 64-2, under ideal conditions, must be in the approximate orders of zero, plus 32 or minus 32 for the weighted component values of I2avg. and Q2avg. noted hereinabove.

In one mode of operation, the digital integrators 64-1 and 64-2 operations are performed in the CPU 110 by a so-called time constant sequence of operations in which the new I2 value is placed in a first temporary RAM 114 register and the contents of the I2avg. high order byte and and low order byte into the CPU accumulators A and B, respectively. The values in the accumulator A and B registers are divided by two in four consecutive arithmetic shift operations to produce a value equal to 1/16 of the original value. The CPU index register is used as a counter by setting it to the count of 4 and the contents of accumulators A and B are loaded into the first and second temporary registers. The resultant double precision number contents of the accumulator A and the accumulator B is divided by two by each arithmetic shift operation and the index register is decremented by one count until its count reaches zero so that the contents remaining in the accumulators A and B is approximately 1/16 of the original I2avg. value loaded therein. The high order byte is saved as the new approximate divided by sixteen value of I2avg. (I2avg./16) and the low order byte is saved as the remainder of the divide by sixteen operation. The contents of the accumulators A and B are subtracted from the contents of the first and second temporary registers, which include the original high order and low order byte values of the I2avg. component value, to produce approximately fifteen-sixteenth of the previous I2avg. value. The new I2i component value in the third temporary RAM register is added to the last described operation to produce a new I2avg. component value in a new high order byte and low order byte data word approximately equal to the I2i component value plus 15/16 of the last I2avg. value. The new values in the accumulator A and B are loaded into the two RAM registers of store 148 with the high order byte providing I2avg. component used further in the demodulator 14. The above operation is repeated for deriving the approximate Q2avg. component value so that each new value thereof is equal to the new Q2i value plus 15/16 of the last Q2avg. value which is stored in RAM register store 150 in the same manner as I2avg. is in register store 148.

As noted hereinabove, ambiguities occur in the vector angle divider operation so that the sign of the new Q2avg. must be tested to avoid ambiguities of the vector divider operation. The Q2avg. component value effectively goes through the ±180° reference axis. Accordingly, the aforementioned sequence of operation continues following calculation of a new Q2avg. component value to first determine whether or not the I2avg. is greater than zero or is a positive number at sign comparator block 210 in FIG. 9B. If it is, the new Q2avg. is saved. If the I2avg. component value is negative then the sign of the previous Q2avg. in the contents of the Q2avg.0 register store 156 is compared to the sign of the present Q2avg. component value. If the signs are the same polarity, then again the new Q2avg. component value is saved. If the sign polarities of the previous and present Q2avg. component values are different, then a flag bit is set so the binary state of the flip-flop 162 is complemented, as indicated by the output line 212 from the sign comparator block 210 in FIG. 9B, when the resultant divided by two reference phase angle vectors VR(IR,QR) is derived in the vector angle divider block 70 from the present I2avg. and Q2avg. values.

Having described the result of the digital integrator operations of the diagram blocks 64-1 and 64-2, the carrier detection operation generally indicated by the block 66 in FIG. 2 is now described. The corresponding general reference numeral 66 in FIG. 9B generally designates a V2avg. vector calculation block 220 and the threshold comparator 224. The carrier detection operation is accomplished by calculating an approximate RMS (effective) value or a vector magnitude of the the vector represented by the I2avg. and Q2avg. component values. The V2avg. value calculated is an approximation of the value of the square root of the sum of the squares of the absolute numerical values of I2avg. and Q2avg. to effectively measure the measure of the V2avg. vector. This approximation calculation is accomplished by taking the absolute value of the larger of the I2avg. and Q2avg. component values and adding one-half the absolute value of the smaller of the two I2avg. and Q2avg. values. The aforementioned operation is accomplished by loading the Q2avg. and I2avg. component values into the accumulator A and B registers. The absolute values of the contents of the accumulator A and B registers are derived by negating the contents thereof if they are found to be negative. The contents of the accumulator B register is compared to the contents of the accumulator A register to determine if it is larger and if it is, the contents of the accumulator A register is divided by two, and if it not, the contents of the accumulator B register is divided by two. Then the contents of the accumulators A and B are summed. It is to be noted that in this operation only the high order byte of each of the I2avg. and Q2avg. component values are processed to establish the approximate V2avg. magnitude value thereof.

The calculated V2avg. value from block 220 is then compared with the value in the contents of the carrier detection threshold register 163 which is a four-bit binary number equal to a numerical value to the base ten of about nine or ten. This threshold value is about one-third of the theoretical approximate maximum of 32 which is ideally reached by the aforementioned digital integrator operations. If the approximate V2avg. vector value is below the threshold at block 224, then the carrier detection condition has not been reached. The bit synchronization counter registers and store registers are reinitialized by setting the present M-sum register store 172 to zero, setting the count of the data bit counter register 130 to the count 4, setting the maximum M-sum register store 260 to zero, and setting the M store and M-sum store registers 181 through 188 to zero and clear the register producing the carrier detect CD logic output to zero. If the calculated V2avg. vector value is greater than the threshold at block 224, then the carrier detect CD logic will be set giving a logical indication of carrier detection to signal receipt of the carrier signals 30. The carrier detect CD signal logic 1 state then enables the above-noted registers to begin the bit synchronization operations described in further detail hereinbelow.

Referring now to vector angle divider block 70 in FIG. 9B, the reference phase angle vector VR components IR and QR are computed in the operation of a half angle divider calculation operation represented by the block 70. As noted hereinabove in connection with the description of FIG. 8 the IR and QR component values are calculated from the I2avg. and Q2avg. vector component values wherein the phase angle of the V2avg. (I2avg.,Q2avg.) vector is assumed to lie in the region between minus 180° and plus 180° or in one of the actual segments identified by circled numerals in FIG. 11A and the VR(IR,QR) vector is preselected to lie in the first and fourth quandrants and in the eight equal forty-five degree segments identified by circled numerals in FIG. 11B which are the half angle segments corresponding to like designated octant segments in FIG. 11B. The V2avg.(I2avg.,Q2avg.) vector is halved to find the corresponding angle of the VR(IR,QR) vector from the I2avg. and Q2avg. components and the resultant component values thereof provide IR and QR component values as found from the calculated angle and the magnitude information of the I2avg. and Q2avg. component values. As further noted hereinabove, the values of IR and QR lie within a range of zero to thirty-two. Accordingly, the reference vector VR(IR,QR) lies within the plus and minus 90° plane of FIGS. 8 and 11B.

Figure 11A:
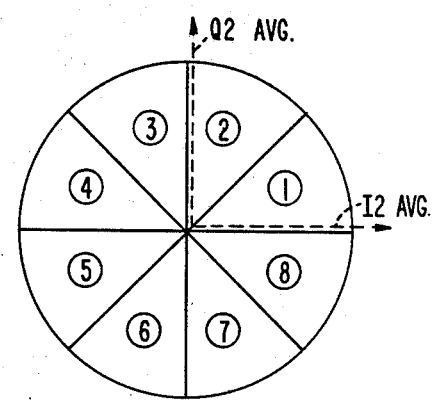
FIGS. 11A and 11B are graphs of the planes of V2avg. vector components I2avg. and Q2avg. and VR vector components IR and QR, respectively, for purposes of illustrating the operation of dividing a vector in the plane of FIG. 11A by two to produce a vector in the plane of FIG. 11B in accordance with the operation of a vector angle divider shown in FIGS. 2 and 9B.
Figure 11B:
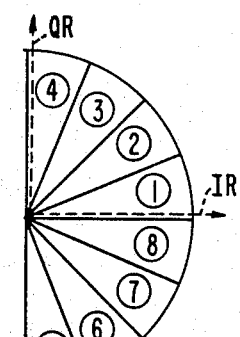

A vector divide sequence of operation in the CPU 110 provides, in an approximate method of calculating, the half frequency or half angle of the V2avg.(I2avg.,Q2avg.) vector which is located within a circle plane divided into octant segments shown in FIG. 11A and producing the corresponding divided vector of the half angle plane of FIG. 11B. The sequence of calculation of the vector angle divider 70 begins by taking the I2avg. component and the Q2avg. component and effectively defining the corresponding V2avg. vector and then determining which octant segment of FIG. 11A it lies in. The I2avg. and Q2avg. component values are loaded into the accumulator A and B registers from the register stores 148 and 150, respectively. A first decision step in the sequence of operation is to compare whether or not the Q2avg. value in accumulator B is greater than the I2avg. contents in accumulator A and if it is not, the the angle V2avg. lies in the semi-circle plane of octant segments 1, 8, 7 and 6 in FIG. 11A and if it is, it lies in the other semi-circle plane octants. The contents of the accumulator B is negated if Q2avg. is greater than I2avg. and then a further decision is made to compare whether the new negated contents of the accumulator B is greater than that of the accumulator A to determine if the vector V2avg. is in octant segments 6 and 7 or 1 and 8 and if it is not, then the IR component is equal to the contents of the accumulator A and the QR component is equal to one-half the negated value in the accumulator B. Thus, the approximate half angle of the I2avg. components defining a V2avg. vector in the octants 1 and 8 in FIG. 11A is converted to approximate IR and QR components defining the resultant VR vector in the segments 1 and 8 in FIG. 11B. If the latter comparison of accumulators B and A finds that the negated Q2avg. component value in the accumulator B is greater than I2avg. contents in accumulator A, then the contents of accumulator A is divided by two and the IR component is then equal to the sum of the contents of the accumulators A and B and the component QR is equal to the contents of the accumulator A minus the negated contents of the accumulator B. Thus, the vector V2avg. (I2avg.,Q2avg.) is in octant segments 6 and 7 in FIG. 11A and is converted to the approximate IR and QR components defining the resultant VR vector in segments 6 and 7 in FIG. 11B.

If the original comparison finds that the Q2avg. value contents of accumulator B is greater than the I2avg. contents of accumulator A, then the V2avg. vector lies in the half circle plane including segments 2, 3, 4 and 5 in FIG. 11A. The I2avg. component value contents of accumulator A are negated and the Q2avg. value contents of the accumulator B is compared to determine whether or not it is greater than the new negated I2avg. value contents in the accumulator A. If the Q2avg. value is greater, the angle of V2avg. within the octant segments 2 and 3 and the I2avg. value contents of the accumulator A is made equal to minus one-half the contents of accumulator A and the component IR is then set equal to the sum of the contents of accumulator B and accumulator A and the component QR is equal to the contents of the accumulator B minus the contents of the accumulator A. Thus, the approximate IR and QR component values of the corresponding VR vector is defined in segments 2 and 3 in FIG. 11B. If the results of the last identified comparison find that the Q2avg. component contents of accumular B is not greater than the I2avg. component contents of accumulator A, the angle of V2avg. is in the segments 4 and 5 (adjacent the plus 90° and minus 90° axes and the decision as to whether the Q2avg. component contents of accumulator B is greater than zero is made and if it is, the QR component is equal to the contents of the accumulator A and the IR component is equal to the contents of the accumulator B divided by two thus defining the approximate IR and QR components in the segment 4 of FIG. 11B. If the last-mentioned comparison of the contents of the accumulator B being greater than zero is not true, then the contents of the accumulator A and the contents of the accumulator B are negated and the QR component is then set equal to the contents of the accumulator A and the IR component is then set equal to the contents of the accumulator B divided by two thus defining the approximate IR and QR components in the segment 5 of FIG. 11B. The values as determined hereinabove for the IR and QR components are then transferred from the appropriate accumulator A or B to the registers stores 158 and 160 respectively shown in FIG. 9B.

From the above descriptions of FIG. 9B, the resultant phase angle vector Vi(Ii,Qi) derived from a single binary phase coded image signal Si and the reference vector VR(IR,QR) vector responsive to a weighted sum average of sixteen phase coded image signals Si have been determined. The Ii and IR components are applied to a multiplier represented by the block 216 and the Qi and QR components are applied to a multiplier represented by the block 218 in which both multipliers are in the aformentioned phase detector 76. A four quadrant multiplication operation is performed in the CPU 110 to multiply the Ii and IR components and the Qi and QR components by initially loading the accumulator A with the contents of the Ii register store 140 and the accumulator B with the contents of the IR register store 158 and then multiplying the contents of these two accumulator registers. The result is then loaded into a temporary RAM storage register. Similarly, the accumulators A and B are loaded with the contents of the Qi register store 142 and the contents of the QR register store 160 and the contents of the two accumulators are multiplied and the results stored in one of the accumulators A or B and then the product of the Ii×IR multiplication is transferred from the temporary register to the other accumulator. The sums of the two accumulators A and B are then obtained by adding the contents thereof as indicated at the block designated by the numeral 248. The contents of the result of the sum operation indicated by the block 248 is either passed with the same sign or reversed by the sign inverter block 244 under control of the flip-flop register 162 to produce a correlation signal 77. The resultant phase detector output correlation signal 77 is stored in the RAM register store 164. The +M or −M correlation signals 77 at the output line 250 are the signed eight bit data word signal noted hereinabove having a numerical value which is relatively large when the vector Vi(Ii,Qi) is substantially aligned or 180° oppositely aligned with the reference vector VR(IR,QR) as also noted above.

The foregoing description has described how a binary phase coded image signal Si of a single carrier segment is converted to a resultant relative phase angle vector Vi(Ii,Qi) representing a segmental or partial measure of a phase modulated carrier data bit and correlating the Vi vector signals with the reference vector VR signals derived by effectively smooth filtering the phase angle representations of the carrier segments of four carrier data bits. The remaining portions of the demodulator 14 are shown in the FIG. 9C indicating the operations for properly grouping the phase detector 76 output correlation signals 77 (±M) for each carrier segment to determine data bit synchronization and then resolving and correlating the data bit sign ambiguity to reconstitute the transmitted data bit signal logic. The initial operation of the demodulator 14 is assumed to have already reached carrier detection and the carrier detect logic signal CD having been already initiated by a logic 1 state but prior to data bit synchronization. The data bits counter 130 of FIG. 9A begins counting from count 5 during the time following carrier detect CD and is decremented by one count for each thirty-two sampling pulses included in each carrier data bit. Accordingly, correlation signals 77 shown on line 250 in FIG. 9C and noted hereinabove as being a signed binary number data word in two's complement wherein the magnitude is scaled or weighted for appropriate manipulation in the CPU 110 and related to the ideal values described hereinabove for purposes of this description. For purposes of describing the operation in FIG. 9C each of the phase detector 76 correlation signals 77 is represented by either a plus or minus sign preceding the letter M as noted earlier. The correlation signals 77 ($\pm$M) are sequentially loaded into the M store 1 through 4 registers 181, 182, 183 and 184. The contents of the registers are summed with each new signal 77 output from the phase detector 76 and a resultant M-sum is stored in the M-sum register 176. In summing the contents of the four registers 181 through 184, the index register in the CPU 110 is used as a counter and as a pointer to the RAM addresses of the registers 181, 182, 183 and 184. The contents of the accumulator A are loaded with the value of a first $\pm$M correlation signal 77 from register 181 and then the value of the contents of the accumulator A are added with the value of the next $\pm$M correlation signal 77 and each add operation decrements the index counter until all of the M store 1, 2, 3 and 4 registers have been addressed and their sum has been obtained and stored in the M-sum register 176. The contents of the M-sum register 176 is loaded into the accumulator A and the absolute value of the M-sum is obtained as indicated by the M-sum absolute value diagram block 256. The absolute M-sum values are sequentially loaded in an appropriate one of the M-sum store 1, 2, 3 and 4 registers designated 185, 186, 187 and 188, respectively. The registers 185, 186, 187 and 188 are loaded with each new M-sum or correlation sum signal 87 value so that after the first four $\pm$M correlation signals 77 each will be stored in one of the registers 181 through 184 and the absolute sums will be added to the previous absolute sums and stored in the four M-sum registers 185 through 188 as increasing M-sum values. Further using the indexed addressing mode in the CPU 110 the one register of the registers 185 through 188 having a maximum absolute value is determined by a maximum M-sum comparator operation indicated by the diagram block 190. The new maximum M-sum value is stored in a maximum M-sum register store 260 by being added to the previous maximum M-sum value. Each new maximum M-sum sets a flag register so that the sum sequence counter 132 in FIG. 9A is initialized to a count zero and thereafter will be incremented one count each new count with each new phase coded image signal Si and upon reaching a count of 0 will indicate the end of a carrier data bit. The operation for setting the sum sequence counter 132 to zero is shown by the block 190 initiating a logic signal through the reset logic gate 266 and to a reset input of the counter register 132. The gate 266 is enabled by the output of a threshold comparator 268 which, as noted hereinabove, disables the resetting of the counter 132 after a predetermined threshold value, as indicated by the block 270, is reached. Thus, several data bit intervals following carrier detection are available for establishing the data bit synchronization. The sum sequence counter 132 is then in a synchronizing counting cycle and continues to be incremented from count zero to count three for each group of four phase detector output $\pm$M correlation signals 77 which counts will be offset from the four counts of the counter 128.

Reference is made to FIG. 10 for a further understanding of the data bit synchronization operation wherein time graphs of $\pm$M correlation signals 77 are indicated as may be typically stored in M store registers 181 through 184 and corresponding absolute values of M-sum signals 87 are stored in M-sum store registers 185 through 188 as they would process the series of +M, -M signal 77 values from the phase ($\phi$) detector outputs shown at the third line from the top of FIG. 10 occurring at times T1 through T10. Also shown in the time graphs of FIG. 10 are the carrier data bits one, zero and one which could ideally provide the +M and -M signal values at the corresponding times, in one exemplary mode of operation of the demodulator 14. Also shown in FIG. 10 are the corresponding time graphs of counts (Cis) of the counter register 128 and of the counts (Css) of sum sequence counter register 132.

It is noted that each of the registers 181 through 188 receives an initial value which is underlined in FIG. 10 and thereafter the register values remain the same during the following three times. At time T1 the associated +M value is loaded in register 181. The sum of the previous three register values will be zero so that the first M-sum value M is loaded into register 185. Since this is the first maximum it will be loaded into the maximum sum register store 260 and the counter 132 will be reset. At another example time T6, the register 182 will be loaded with a -M value replacing the previous +M value loaded at time T2. The M-sum value at time T6 will be the absolute sum of the signed values of $\pm$M occurring at times T6, T5, T4, and T3 having a 4M value which is added to the previous sum value of 2M in register 186 so that a new maximum M-sum of 6M is provided therein at time T6. Thus, the counter 132 will be reset at time T6, if not already, and the value of the maximum M-sum register store 260 will be the same as register 186. Comparison of the zero counts of the counter register 132 and the second and third lines at the top of FIG. 10 indicates that the four like sign $\pm$M correlation signals 77 are grouped with one carrier data bit interval and the M-sum value produced at the count zero of the counter register 132 is the $\pm$M-sum correlation sum signal 87 value for a data bit and further that the zero count indicates the end of a data bit interval. Accordingly, each count zero of signal Css from counter 132 initiates and M-sum signal dump to the M-sum register store 176 and clears the M-sum registers 181-184 to begin a new M-sum value accumulation after data bit synchronization. The $\pm$1 relative values for +M and -M unit values in FIG. 10 are realistic approximations since in illustrating the M-sum values they will each be large positive and large negative numerical values. It is also seen that the M-sum store 2 register 186 has a magnitude which increases much more rapidly than the other three registers 185, 187 and 188. The foregoing operation continues until the maximum M-sum reaches the predetermined threshold as indicated by the comparator 268 so the reset logic get 266 is inhibited from further resetting of the counter register 132. This ends the data bit synchronization which occurs prior to the tenth and eleventh carrier preamble data bits which are processed as polarity indicators.

As noted hereinabove the data bit counter 130 will be decremented to the count of 1 during which time the data bit synchronization will have been accomplished and the sum sequence counter 134 will be fixed to establish the data bit synchronization and each proper group of four ±M correlation signals 77 will be summed together to define the ±M-sum values for the correlation sum signals 87 included in a data bit.

Referring now to the data bit sign correlator 92 operation in FIG. 9C, it is initially noted that in the beginning portions of the program sequence of operation in the CPU 110, as previously noted, that following the decrement of the counter register 128 a decision point is reached to determine if the count of the data bits counter 130 has reached zero. If it has not, the above sequences of operation are performed during the first five data bits of the preamble following carrier detection to synchronize with the carrier by establishing the binary phase coded image signals Si and to establish the data bit synchronization as described hereinabove. If the count of the data bit counter 130 has passed count one indicated by Cdb1 and reached count zero, then the sequence of operation is enabled to compare the sign of the contents of the present M-sum register 172 and sign of the contents of the last M-sum register 174 which two registers store the M-sums of the last two data bits received. Since the M-sums are signed binary numbers, the m.s.b. bit b7 of each of the data word registers 172 and 174 are compared to determine if they are equal, indicating that the two double polarity indicator data bits ten and eleven of the preamble have been received. If the signs are the same they are effective to operate the flip-flop 2 logic register 178. The logic gate block 274 represents the gating of the two bit 7 sign bit values of the registers 172 and 174 in response to the gate enable signal Cdb1 which is initiated when the data bit counter reaches the count one. The flip-flop register 178 is set to the state that is the same as the logic state of the common sign bits when they are stored in M-sum registers 172 and 174. The sign bit correlator essentially assures that the sign of the correlation sum signal 87 will produce high and low logic states in data signals 32 when one and zero data bits occur in the received carrier message. If the two M-sum sign bits are both negative or binary 1, the flip-flop 2 register 178 is set to binary 1. If the two M-sum sign bits are both positive or binary 0 as indicated by a m.s.b bit b7 zero, then the flip-flop register is set to 0, and the output from the M-sum register 172 will have the same positive or data bit one polarity in the output data 32 as it has in the register 172. The sign comparator operation indicated by the block 275 initiates a reset logic function at block 282 to decrement of the data bit counter 130 so that it is set to a minus value indicating that the eleven data bits of the preamble has been processed further indicating that the data bit synchronization and data bit sign correlator operations have been completed and that each further data bit in the carrier transmitted data is part of the message data bit information to be received. Thus, the counter register 130 is further used as a demodulator status flag register. The initially synchronized conditions of the phase demodulator 14 are then fixed and remain throughout the processing of the remaining message data transmitted thereto.

In providing the demodulator data output 96 in the microcomputer system 108 during receipt of the carrier modulated message data, the hard-limited carrier signals 30 are sampled as described hereinabove to define the eight sample bits representing one waveform cycle derived from the hard limited carrier signals 30 occurring during carrier segment and one-fourth of a data bit interval. The corresponding resultant relative phase angle vector Vi(Ii,Qi) is produced for each single group of eight sample bits and the reference vector VR(IR,QR) is produced over a sixteen carrier segments time period so as to vary slowly with errors or changes in the phase angle vector representations as they occur. The phase detector 76 output 78 provides ±M correlation signals 77 for each vector Vi(Ii,Qi) generated and the ±M correlation signals 77 are summed beginning with each carrier data bit as controlled by the sum sequence counter 132. The flip-flop 2 logic register 178 will remain fixed throughout the data message received to correlate the sign of the ±M-sum signals 87 with the data bit logic one and zero states in the transmitted message data. Thus, the signs of the M-sum signals 87 provide the high and low binary states in the demodulated data signals for each received data bit one and zero, respectively.

To produce an equivalent data bit correlator operation to that described above, the CPU 110 tests the sum sequence counter 132 and a negative value indicates that the demodulator 14 is the mode for processing the message data bits to the output. The signed M-sum signal 87 in M-sum register store 172 is loaded into the accumulator B register of the CPU 110. The logic state of the flip-flop 2 register 178 will be set to the M-sum sign at the time of the polarity indicator bits and is tested. If the sign logic states of the M-sum signal 87 and register 178 are different, the contents of the accumulator B are complemented; if the states are the same, then the contents are not changed. The foregoing provides an exclusive-OR-like logic function in the data bit sign correlator operation for signed two's complement binary number data word of the M-sum register 172. Accordingly, the m.s.b. bit b7 of the M-sum data word signal 87 produces the binary states in output data signals 32. The data I/O port 118 is initialized to output the data out signals 32 on line 36 so that a binary 1 at the input to the I/O ports 118 effects a high state in the signals 32. Thus, high and low voltage states at the data I/O line 36 will correspond to the M-sum signals 87, m.s.b. bit b7 or sign bit 0 and 1 logic states, respectively when the flip-flop register 178 has been set to the logic 0 state. The signal output line 36 is shown applying the data signals 32 directly to the control logic block 35 in one form of the invention wherein address and function decoding operations are also provided in the microcomputer system 108.

The foregoing operation of the phase demodulator 14 has been described with respect to substantially ideal and error-free operation. In actual operation, noise and slips in the frequency of the sampling pulses 37 relative to the received carrier phase in the signals 30 will produce occasional substantial phase indicating changes in the groups of sample bit signals derived from associated carrier segments so that they will not always produce four bit sample zeros and four bit sample ones for each segment as shown in FIG. 7. For example, five or six of one sample bit polarity and three or two of the other sample bit polarity, respectively, can occur in one eight sample bit group forming a phase coded image signal Si. Thus, the resultant relative phase angle vector Vi(Ii,Qi) signals will represent a phase angle vector substantially different from the same or 180° opposite phase angle vector than the preceding Vi(Ii,Qi) signals which ideally would be substantially aligned with or 180° out of phase with the reference vector represented by the VR(IR,QR) signals. The resultant ±M correlation signal 77 at the phase detector 76 may have a very low numerical sign value or magnitude in the same sign polarity of the other ±M correlation signals 77 of the same data bit or even a high sign magnitude in the opposite polarity. The effect on the VR(IR,QR) vector signals is slight since each new phase coded image signal Si only contributes one-sixteenth of the resultant VR(IR,QR) signals. Even if the one correlation signal 77 from the phase detector 76 has an opposite sign from the other three ±M correlation signals 77 associated with same data bit, the three correlation signals of common sign will still produce a signed ±M-sum correlation sum signal 87 value consistent with the binary logic state of the associated detected carrier data bit. Thus, the sign of the resultant numerical value obtained from summing ±M four correlation signals 77, as produced by the M-sum signal 87, provides the detected polarity in the demodulator 14 representing an associated logic state of the received carrier data bit. While the foregoing is an example of compensation for an inconsistent or error change in a ±M correlation signal 77, it is further noted that the demodulator 14 also compensates for slowly changing phase angle detection conditions occurring between the sampling instants of the sampling pulses 37 and the phase of the hard-limited signals 30. Such slow changes effect slow variations in the VR(IR,QR) signals with changing angle representations of the phase coded image signal Si so that the individual ±M correlation signals 77 continue to be produced having ±M-sum values of the correlation sum signals 87 representing a high degree of correlation with either of the opposite carrier phase conditions representing binary one and zero data bit information. The end of a carrier data transmission is detected in the demodulator 14 by loss of carrier detection, which causes the carrier detect logic signal to be reset to a binary 0 state. The aforementioned store and counter registers that are controlled by the CD logic signal are reset and the demodulator 14 continues to sample the receiver output to detect another carrier transmission and repeat the initializing synchronization, sign correlator and data demodulation operations described above.

While a preferred embodiment of the present invention is disclosed hereinabove, other alternatives and modifications may be made, as understood by those skilled in the art, without departing from the spirit and scope of my invention.

I claim:

1. A power line carrier communication system for transmitting coherent phase shift keyed (CPSK) carrier data transmissions, comprising:
power line coupler means for being mounting in signal communication with power line conductors transmitting a carrier having binary phase modulated data;
receiver means for receiving carrier signals from said power line coupler and including high pass filter means for attenuating electric power frequencies conducted on said power line conductors along with said carrier, said receiver further including band filter means having a center frequency substantially equal to a predetermined frequency of said carrier and still further including signal clipping and amplifying means for producing hard limited signals varying between two levels in response to said carrier; and
a coherent phase demodulator for receiving said hard limited signals and including a source of sampling pulses having a predetermined sampling frequency wherein the ratio of said carrier frequency and said sampling frequency is not equal to an integer, polarity sampling means for producing polarity sample bit signals having binary values responsive to the two levels of said hard limited signals and occurring at the frequency of said sampling pulses, said sample bit signals having reoccurring predetermined groups thereof with an integer number of said groups occurring during each one of equal data symbol times in said carrier, whereby said groups define plural carrier segments within each data symbol time, said demodulator further including means producing first vector signals representing a relative phase angle corresponding to the binary coded values of each of said groups of sample bits and still further including means producing reference vector signals representing a phase angle responsive to weighted sum averages of phase angle representations corresponding to binary coded values of each of a predetermined integer number of said groups of sample bits occurring an integer number of said data symbols, said demodulator still further including phase detector means responsive to said first vector signals and said reference vector signals for producing correlation signals representing relative measures of positive and negative correlation of the phase angles of said first and reference vector signals, said demodulator still further including summing means for algebraically adding said correlation signals derived from each of said first vector signals produced during said plural carrier segments and within each data symbol and correspondingly producing correlation sum signals having positive and negative values representing opposite binary conditions of the carrier data symbols, and said demodulator still further including data bit output means having means for continuously relating the positive and negative values of said correlation sum signals to one and the other of said opposite binary conditions of said data symbols, respectively, for producing data bit output signals having the same binary logic states during the received carrier data symbols of a single carrier data transmission.

2. The power line carrier communication system as claimed in claim 1 wherein said carrier has a frequency within a range of about 9 kHz to 15 kHz.

3. The power line carrier communication system as claimed in claim 2 wherein said receiver means and said coherent phase demodulator means are both included in large numbers of communication terminals located at remote electric power customer locations for producing automated monitoring and control of electric loads at the remote customer locations.

4. The power line carrier communication system as claimed in claim 1 wherein said carrier data transmissions include a message format having data information immediately preceding a preamble format having plural synchronizing data bit symbols and plurality of polarity indicator data bit symbols.

5. The power line carrier communication system as claimed in claim 4 wherein said coherent phase demodulator includes data bit synchronization means responsive to said correlation signals produced during the occurrence of said plural synchronizing data bits so as to produce consecutively occurring correlations sum signals at said summing means and being further responsive to consecutively occurring sums of absolute values of said correlation sum signals, and said synchronization means including selectively resettable counter means for cyclically controlling said summing means so as to algebraically sum predetermined groups of said correlation signals with said resettable counter having an initial reset condition in response to a maximum one of said sums of absolute values of said correlation sum signals.

6. The power line carrier communication system of claim 5 wherein said coherent phase demodulator includes a data bit correlator means responsive to consecutively occurring correlation sum signals having common ones of either of said positive and negative values thereof produced in response to said plural polarity indicator data bits and temporary storage means for storing a binary logic state identifying the common ones of either of said positive and negative values for effecting said continuously relating of the positive and negative values of said correlation sum signals to said data symbols.

7. The power line carrier communication system of claim 6 wherein said data bit correlator means includes counter means responsive to the common ones of either of said positive and negative values of the correlation sum signals being produced to indicate the end of said preamble format and the beginning of said message format.

* * * * *